(12) United States Patent
Mouser et al.

(10) Patent No.: US 10,585,460 B2
(45) Date of Patent: Mar. 10, 2020

(54) POLE INTEGRATED REPEATER SYSTEM

(71) Applicant: WILSON ELECTRONICS, LLC, St. George, UT (US)

(72) Inventors: Michael James Mouser, Wylie, TX (US); Patrick Lee Cook, Cedar City, UT (US); Christopher Ken Ashworth, St. George, UT (US); Casey James Nordgran, Washington, UT (US); Eddie F. Iglesias, Hurricane, UT (US)

(73) Assignee: WILSON ELECTRONICS, LLC, St. George, UT (US)

( * ) Notice: Subject to any disclaimer, the term of this patent is extended or adjusted under 35 U.S.C. 154(b) by 0 days.

(21) Appl. No.: 16/011,475

(22) Filed: Jun. 18, 2018

(65) Prior Publication Data

US 2018/0364771 A1 Dec. 20, 2018

Related U.S. Application Data

(60) Provisional application No. 62/521,103, filed on Jun. 16, 2017.

(51) Int. Cl.
| | |
|---|---|
| *G06F 1/16* | (2006.01) |
| *H04B 7/155* | (2006.01) |
| *H04W 84/04* | (2009.01) |
| *H04W 88/02* | (2009.01) |

(52) U.S. Cl.
CPC .......... *G06F 1/1698* (2013.01); *G06F 1/1632* (2013.01); *H04B 7/15542* (2013.01); *H04W 88/02* (2013.01); *H04W 84/047* (2013.01)

(58) Field of Classification Search
CPC .... G06F 1/1632; G06F 1/1698; G06F 1/1626; H04B 7/15542; H04B 7/15564; H04W 84/047; H04W 88/02

USPC ... 455/7, 13.1, 575.1, 13.4, 15, 11.1, 10, 24, 455/63, 67.4, 9, 422.1; 343/890, 878
See application file for complete search history.

(56) References Cited

U.S. PATENT DOCUMENTS

| | | | |
|---|---|---|---|
| 4,041,389 A | 8/1977 | Oades | |
| 4,776,032 A | 10/1988 | Odate et al. | |
| 5,303,395 A | 4/1994 | Dayani | |
| 5,737,687 A | 4/1998 | Martin et al. | |
| 5,777,530 A | 7/1998 | Nakatuka | |
| 5,835,848 A * | 11/1998 | Bi ..................... | H04B 7/15578 455/24 |
| 6,005,884 A | 12/1999 | Cook et al. | |
| 6,222,503 B1 * | 4/2001 | Gietema .............. | H01Q 1/1207 343/700 MS |
| 6,351,248 B1 * | 2/2002 | Hill ....................... | H01Q 1/246 343/789 |

(Continued)

FOREIGN PATENT DOCUMENTS

EP 1525678 B1 7/2008

OTHER PUBLICATIONS

3GPP2 C.S0011-B; "Recommended Minimum Performance Standards for cdma2000® Spread Spectrum Mobile Stations"; TIA-98-E; (Dec. 13, 2002); 448 pages; Release B, Version 1, Revision E.

(Continued)

*Primary Examiner* — Tan H Trinh
(74) *Attorney, Agent, or Firm* — Thorpe North & Western

(57) ABSTRACT

A repeater system including one or more donor antennas, one or more server antennas and a repeater integrated with a pole.

36 Claims, 15 Drawing Sheets

(56) References Cited

U.S. PATENT DOCUMENTS

| | | | |
|---|---|---|---|
| 6,670,917 B1* | 12/2003 | Maniscalco | G01C 15/00 342/357.57 |
| 6,711,388 B1 | 3/2004 | Neitiniemi | |
| 6,745,003 B1 | 6/2004 | Maca et al. | |
| 6,889,033 B2 | 5/2005 | Bongfeldt | |
| 6,990,313 B1 | 1/2006 | Yarkosky | |
| 6,993,287 B2 | 1/2006 | O'Neill | |
| 7,035,587 B1 | 4/2006 | Yarkosky | |
| 7,221,967 B2 | 5/2007 | Van Buren et al. | |
| 7,756,470 B2* | 7/2010 | Roper | H04B 7/15507 370/310 |
| 7,974,573 B2 | 7/2011 | Dean | |
| 2002/0044594 A1 | 4/2002 | Bongfeldt | |
| 2002/0119748 A1* | 8/2002 | Prax | H04B 7/145 455/7 |
| 2003/0095076 A1* | 5/2003 | Lee | H01Q 1/246 343/837 |
| 2003/0123401 A1 | 7/2003 | Dean | |
| 2004/0137854 A1 | 7/2004 | Ge | |
| 2004/0146013 A1 | 7/2004 | Song et al. | |
| 2004/0166802 A1* | 8/2004 | McKay, Sr. | H04B 7/15535 455/15 |
| 2004/0219876 A1 | 11/2004 | Baker et al. | |
| 2004/0235417 A1 | 11/2004 | Dean | |
| 2004/0248511 A1* | 12/2004 | Flynn | H04B 7/155 455/7 |
| 2005/0085267 A1* | 4/2005 | Lemson | H04B 7/10 455/562.1 |
| 2005/0118949 A1 | 6/2005 | Allen et al. | |
| 2006/0014491 A1 | 1/2006 | Cleveland | |
| 2006/0019603 A1* | 1/2006 | Pergal | H04B 7/15542 455/15 |
| 2006/0084379 A1 | 4/2006 | O'Neill | |
| 2006/0097944 A1* | 5/2006 | McCarville | H01Q 1/286 343/795 |
| 2006/0205343 A1* | 9/2006 | Runyon | H04B 7/15542 455/11.1 |
| 2006/0205344 A1* | 9/2006 | Roper | H04B 7/15507 455/11.1 |
| 2006/0290580 A1* | 12/2006 | Noro | H01Q 21/28 343/715 |
| 2007/0010198 A1* | 1/2007 | McKay, Sr. | H04B 7/10 455/10 |
| 2007/0071128 A1 | 3/2007 | Meir et al. | |
| 2007/0188235 A1 | 8/2007 | Dean | |
| 2007/0247376 A1 | 10/2007 | Kim et al. | |
| 2008/0081555 A1 | 4/2008 | Kong et al. | |
| 2008/0096483 A1 | 4/2008 | Van Buren et al. | |
| 2008/0125033 A1* | 5/2008 | Lee | H04B 7/15585 455/22 |
| 2008/0278237 A1 | 11/2008 | Blin | |
| 2008/0299896 A1 | 12/2008 | Mohebbi | |
| 2009/0131131 A1 | 5/2009 | Wilson | |
| 2010/0197222 A1* | 8/2010 | Scheucher | H01Q 19/30 455/11.1 |
| 2011/0151775 A1 | 6/2011 | Kang et al. | |
| 2011/0312269 A1* | 12/2011 | Judd | G01S 19/25 455/11.1 |
| 2012/0188919 A1 | 7/2012 | Subasic et al. | |
| 2013/0183895 A1 | 7/2013 | Gore et al. | |
| 2014/0155054 A1* | 6/2014 | Henry | H04W 36/22 455/422.1 |
| 2014/0355525 A1* | 12/2014 | Barzegar | H04L 5/0023 370/329 |
| 2015/0180120 A1* | 6/2015 | Pietraski | H01Q 15/0086 342/368 |
| 2016/0021597 A1* | 1/2016 | Hart | H04W 40/06 370/329 |
| 2016/0295495 A1* | 10/2016 | Lotter | H04W 40/22 |
| 2016/0360511 A1* | 12/2016 | Barzegar | H04B 7/155 |
| 2018/0238305 A1* | 8/2018 | McMahon | F03D 13/22 |
| 2018/0294866 A1 | 10/2018 | Ashworth | |
| 2018/0294868 A1 | 10/2018 | Ashworth | |
| 2018/0323860 A1 | 11/2018 | Bohls et al. | |
| 2019/0028902 A1* | 1/2019 | Faraone | H04W 16/24 |
| 2019/0190564 A1 | 6/2019 | Cook et al. | |
| 2019/0222258 A1 | 7/2019 | Bohls et al. | |
| 2019/0260460 A1 | 8/2019 | Ashworth et al. | |

OTHER PUBLICATIONS

ADL5513; "1 MHz to 4 GHz, 80 dB Logarithmic Detector / Controller"; Data Sheet; (2008); 25 pages.

HMC713LP3E; "54 dB, Logarithmic Detector / Controller, 50—8000 MHz"; Data Sheet; (2010); 12 pages.

HMC909LP4E; "RMS Power Detector Single-Ended, DC—5.8 GHz"; Data Sheet; (2010); 21 pages.

PIC16F873; "28/40-Pin 8-Bit CMOS FLASH Microcontrollers"; Data Sheet; (2001); 2018 pages.

International Search Report dated Oct. 8, 2018, in International Application No. PCT/US2018/038103, filed Jun. 18, 2018; 8 pages.

\* cited by examiner

POLE INTEGRATED REPEATER SYSTEM

RELATED APPLICATIONS

The present application claims the benefit of U.S. Provisional Patent Application No. 62/521,103 filed Jun. 16, 2017, the entire specification of which is hereby incorporated by reference in its entirety for all purposes.

BACKGROUND

Wireless communication systems, such as cellular telephone systems, have become common throughout the world. A wireless repeater or booster is a radio frequency (RF) device used to amplify wireless communication signals in both uplink and downlink communication channels, as illustrated in FIG. 1. The uplink channel is generally referred to as the direction from one or more user equipment 110 to a base station 120. The downlink channel is generally referred to as the direction from the base station 120 to the user equipment 110. For a wireless telephone system, the base station 120 may be a cell tower, and the user equipment 110 may be a smart phone, tablet, laptop, desktop computer, multimedia device such as a television or gaming system, cellular internet of things (CIoT) device, or other types of computing device. The repeater 130 typically includes one or more signal amplifiers, one or more duplexers and/or couplers, one or more filters and other circuits coupled between two or more antennas. The antennas can include one or more user-side antennas 140 and one or more service-side antennas 150.

The repeater system may include a plurality of separate elements such as the antennas, cables, repeater unit and mounting elements for each, which can make installation complicated for users. In addition, constraints imposed by government agencies, industry standards, or similar regulatory entities may limit the amount of amplification (gain), the maximum output power, the output noise, and other parameters associated with the operation of the repeater. Therefore, there is a continuing need for improved wireless repeaters.

DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1A:
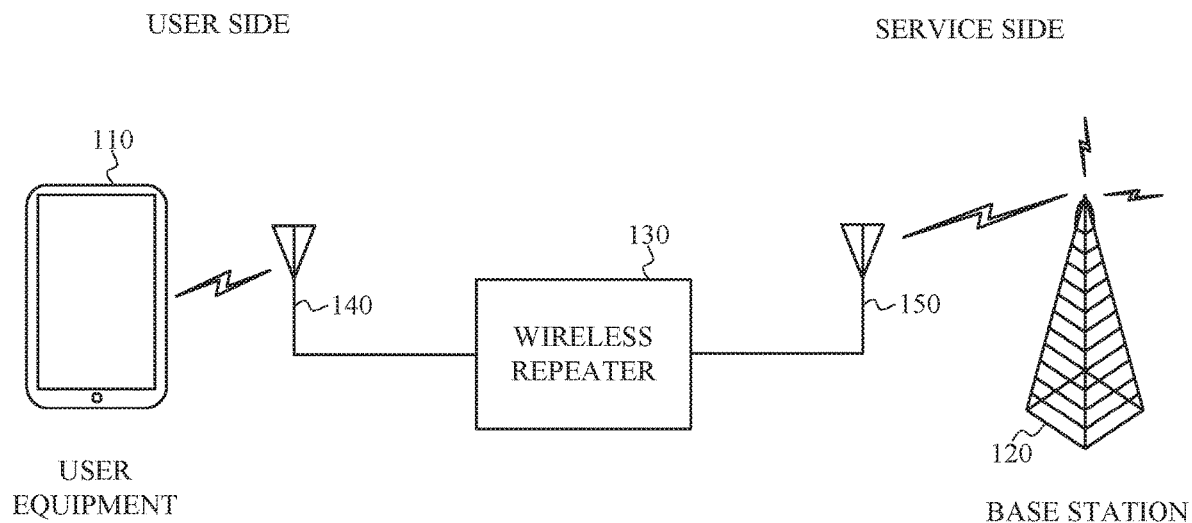
FIG. 1a depicts a wireless network repeater, in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION OF THE INVENTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In one aspect, a repeater system can include a pole with one or more donor antennas, one or more server antennas and a repeater integrated into the pole. The one or more donor antennas can be located toward the top of the pole, and the one or more server antennas can be located toward the bottom of the pole. In one example embodiment, the one or more donor antennas can be advantageously located at the top of the pole to increase a reception of uplink and downlink wireless communication signals between the repeater and one or more base stations. The one or more donor antennas located toward the top of the pole and the one or more server antennas located toward the bottom of the pole, or vice versa, can also reduce oscillations in the repeater resulting from signals transmitted by the one or more donor antennas being received at the one or more server antennas and feedback to the repeater, or vice versa. Installation and setup can be simplified with the one or more donor antennas, the one or more server antennas and the repeater integrated into the pole. The pole with the one or more donor antennas, the one or more server antennas and the repeater integrated therein also enables the repeater system to be portable. Additional example embodiments of the repeater system will be described in the proceeding paragraphs.

Figure 1B:
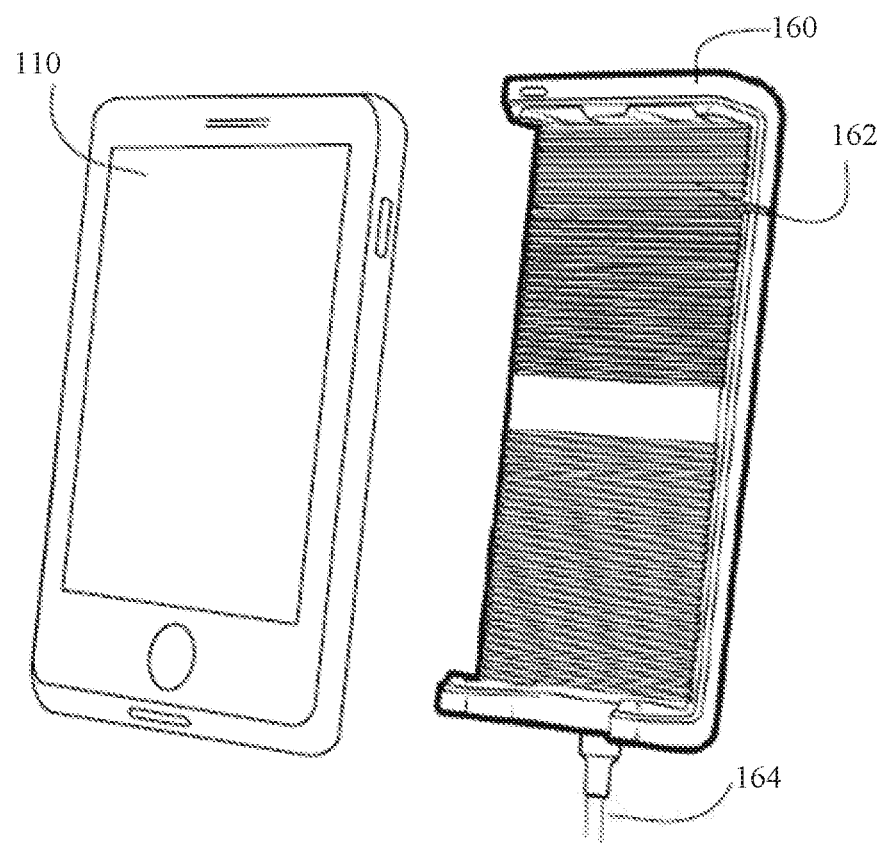
FIG. 1b is a perspective view of a cradle, with a user equipment (UE) removed from the cradle in accordance with an example.
Figure 1C:
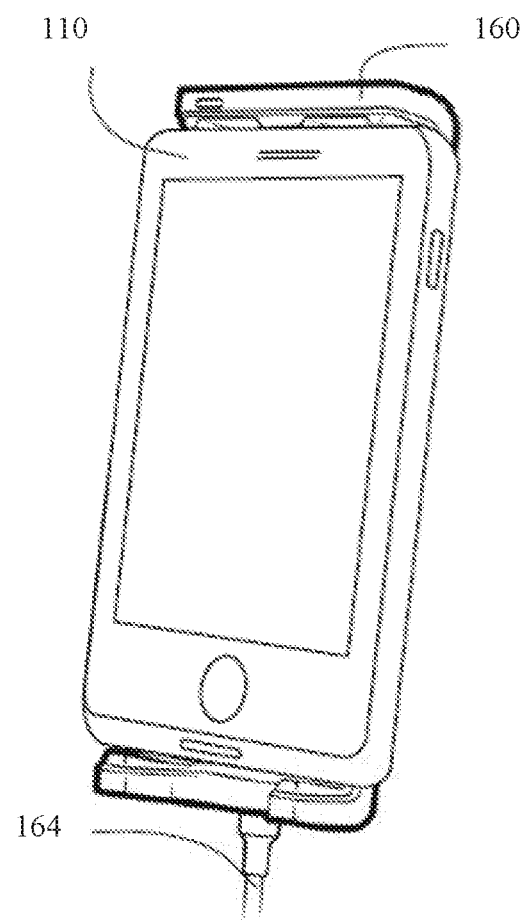
FIG. 1c is a perspective view of a cradle, with a user equipment (UE) carried by the cradle in accordance with an example.

FIG. 1b depicts an example of a cradle with a user equipment (UE) removed from the cradle 160 and FIG. 1c depicts an example of a UE 110 carried by the cradle 160. The cradle 160 can have an interface 162 capable of selectively carrying a UE 110. The interface 162 can removably receive, hold and carry a UE 110. The interface 162 can be sized and shaped to hold and grip the UE 110. The cradle 160 can also have an RF signal coupler such as a server antenna, to wirelessly couple the one or more RF communication signals to the UE 110 when carried by the cradle 160. The interface 162 can be capable of spacing the UE 110 with respect to the RF signal coupler or server antenna, and aligning, or positioning and orienting, the UE 110, and its RF antennas, with the RF signal coupler or server antenna. In one aspect, a back of the interface 162 can abut to the UE 110 to space the UE 110 with respect to the RF signal coupler or the server antenna. In another aspect, fingers, sides or ends can align, or position and orient, the UE 110 with respect to the RF signal coupler or server antenna. The cradle 160 can be coupled to a repeater and/or a signal splitter by co-axial cables 164. In one example, the maximum gain of the coupled repeater can be 23 dB. The maximum gains can be set to different levels, depending on government regulations or system requirements. In addition, in one aspect, the maximum range of the cradle 160 and/or the server antenna or the signal coupler can be 8 inches or 20 cm from a user for radiation safety reasons. The maximum gain of the repeater can automatically adjust based on whether the UE is placed in the cradle or not.

Figure 1D:
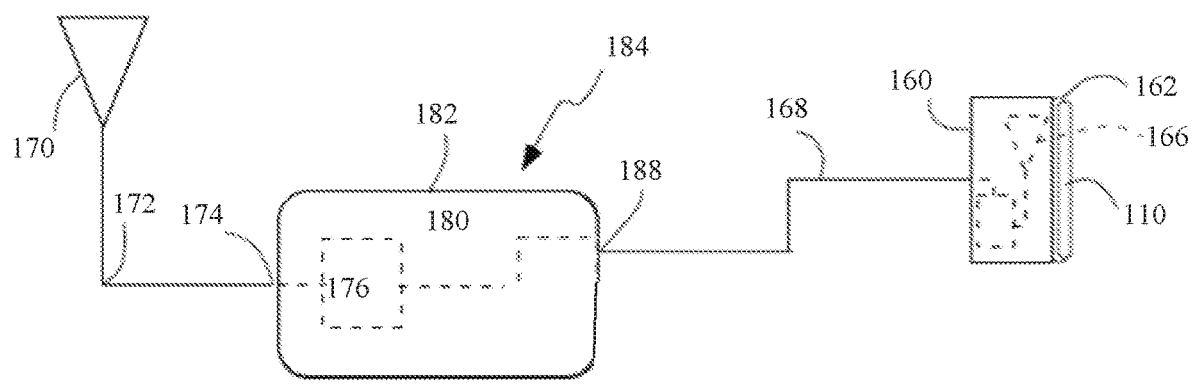
FIG. 1d is a schematic view of a repeater system in accordance with an example.

FIG. 1d depicts an example of a repeater system 184 or signal booster in accordance with an example. The repeater system 184 can boost or amplify one or more radio frequency (RF) communication signals between a donor antenna 170 and a server antenna 166. The donor antenna 170 can be an exterior donor antenna disposed outside of a vehicle or structure. In one aspect, the server antenna 166 can be a signal coupler carried by and disposed in a cradle 160 associated with the repeater system 184. The cradle 160 can hold a UE 110. The cradle 160 can have an interface 162.

The repeater system 184 can comprise a repeater 180, the cradle 160 with the server antenna 166, and the donor antenna 170. The repeater 180 can comprise a bi-directional amplifier (BDA) 176 to amplify the one or more RF communication signals. The repeater 180 can have a housing 182. The donor antenna 170 can be coupled to the repeater 180 via a coaxial cable 172 to a donor port 174. The server port 188 can be coupled to the repeater 180 via a coaxial cable 168.

Figure 2A:
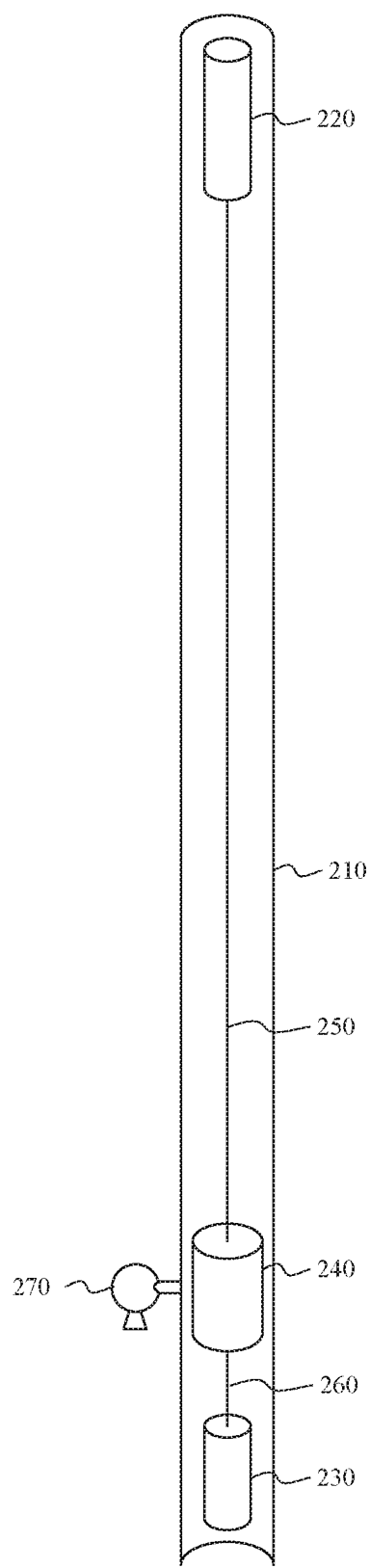
FIGS. 2a and 2b depict a repeater system, in accordance with an example.
Figure 2B:
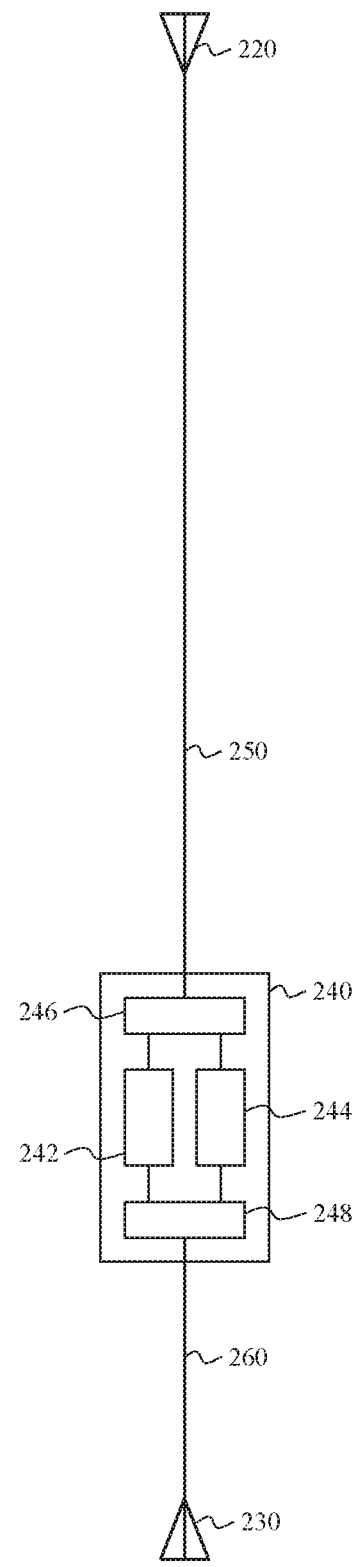

FIGS. 2a and 2b depict a repeater system, in accordance with an example. The repeater system can include a pole 210, one or more donor antennas 220, one or more server antennas 230, and a repeater 240. In the mechanical illustration of FIG. 2a, the repeater system can include a pole 210, a donor antenna 220, a server antenna 230, and a repeater 240. In one aspect, the donor antenna 220 can be configured to transmit and receive uplink and downlink signals between the repeater 240 and one or more base stations. The server antenna 230 can be configured to transmit and receive uplink and downlink signals between the repeater 240 and one or more user devices. The spacing between the donor antennas 220 and the server antennas 230 can vary. Although, the repeater system is described with reference to one pole 210, one donor antenna 220, one server antenna 230, and a repeater 240, it is to be appreciated that multiple repeater systems can be implemented in parallel to provide for multiple input multiple output (MIMO) repeater systems.

In one example, a MIMO system can include a single repeater 240 and two or more donor antennas 220 and two or more server antennas 230. The two or more antennas may be located in a single pole 210 or may be positioned in multiple adjacent poles, with the antennas in each adjacent pole communicatively coupled to a server 240. The server may be carried by one pole in the server system, or may be positioned outside of each of the poles. Alternatively, a MIMO system can be formed using multiple repeater systems, with each repeater system comprising a pole 210 that includes a donor antenna 220, a repeater 240, and a server antenna 230.

In one aspect, the repeater 240 can be communicatively coupled between the donor antenna 220 and the server antenna 230. In one instance, the repeater 240 can be communicatively coupled by respective cables 250, 260 between the repeater 240 and the donor antenna 220, and between the repeater 240 and the server antenna 230, respectively. The cables 250, 260 can be coaxial cables to reduce coupling between the donor antenna 220 and the server antenna 230.

In one aspect, the repeater 240 can be configured to amplify one or more RF communication signals, as illustrated in the circuit illustration of FIG. 2b. The repeater 240 can, for example, amplify various types of RF signals, such as cellular telephone, WiFi, or AM/FM radio signals. In one instance, an uplink amplifier 242 can be configured to amplify signals in one or more uplink bands, and a downlink amplifier 244 can be configured to amplify signals in one or more downlink bands. One or more duplexers and/or couplers 246, 248 can be configured to multiplex, demultiplex and/or couple the uplink and downlink signals between the uplink and downlink amplifiers 242, 244 and the donor antenna 220, and between the uplink and downlink amplifiers 242, 244 and the server antenna 230. In another instance, one or more bi-direction amplifiers can be configured to amplify both uplink and downlink signals of one or more carrier bands. In one instance, the RF communication signals can be cellular telephone RF signals, such as a Third-Generation Partnership Project (3GPP) Long Term Evolved (LTE) uplink and downlink signals when operating in a frequency division duplex (FDD) mode. In one instance, the uplink 3GPP LTE signals may operate in an uplink portion of a selected FDD frequency band and the downlink 3GPP LTE signal may operate in a downlink portion of the selected FDD frequency band. In one instance, the repeater can be configured to operate in one or more FDD bands or time division duplex (TDD) bands including FDD and TDD bands 1-71 listed in 3GPP Technical Specification (TS) 36.101 Version 14.3.0, Tables 5.5-1 and 5.6.1-1, and FDD Band 71 with an UL band from 663 Megahertz (MHz) to 698 MHz and a DL band from 617 MHz to 652 MHz.

Referring again to FIG. 2a, the pole 210 can be any long, relatively slender mechanical support structure. The pole 210 can have a form factor of a cylinder (right circular, elliptic, parabolic, hyperbolic), rectangular prism, triangular prism, pentagonal prism, hexagonal prism, or the like. In one aspect, the pole 210 can be non-conductive. In another aspect, the pole 210 can include one or more metallic portions, such as one or more of caps, fasteners and/or adapters. For example, the pole 210 can include a metal cap coupled to an electrical ground for lightning protection.

In one aspect, the donor antenna 220, server antenna 230 and repeater 240 are carried by the pole 210. In one instance, the server antenna 230 and the repeater 240 can be fixably mounted to a first side of the pole 210 and the donor antenna 220 can be fixably mounted to a second side of the pole 210 that is opposite to the first side of the pole 210. The donor antenna 220 mounted at the second side of the pole 210 can correspond to the top of the pole. Mounting the server antenna 230 and repeater 240 at the second side of the pole 210 can correspond to the bottom of the pole 210. It is to be appreciated that with the server antenna 230 and repeater 240 mounted toward the bottom of the pole and the donor antenna 220 mounted towards the top of the pole 210, in most cases there will be increased mass at the bottom of the pole 210 resulting in a lower center of gravity. The lower center of gravity can resist torque on the pole 210 from wind when the pole is positioned in a vertical direction. In another instance, the donor antenna 220 and the repeater 240 can be fixably mounted to a first side of the pole 210, and the server antenna 230 can be fixably mounted to a second side of the pole 210 that is opposite to the first side of the pole 210. Mounting the donor antenna 220 and the repeater 240 near each other at the first side of the pole 210 can advantageously reduce transmission losses. In one instance, the donor antenna 220, the server antenna 230, and the repeater 240 are encompassed by the pole 210. The donor antenna 220, the server antenna 230 and the repeater 240 can be encompassed by the pole 210, by integrating the donor antenna 220, the server antenna 230 and the repeater 240 with the pole 210, or mounting the donor antenna 220, the server antenna 230 and the repeater 240 inside the pole 210. In one embodiment, the pole can be constructed to be substantially water resistant to provide environmental protections to the server antenna 230, donor antenna 220, and/or repeater 240.

In one aspect, a radiation pattern of the donor antenna 220 can be configured to reduce radiation directed toward the server antenna 230 to minimize feedback from the server antenna 230, through the repeater 240, to the donor antenna 220. A radiation pattern of the server antenna 230 can also be configured to reduce radiation directed toward the donor antenna 220 to minimize feedback from the donor antenna 220, through the repeater 240, to the server antenna 230. In one instance, the donor antenna 220 and the server antenna 230 can be located at a fixed distance from each other to reduce feedback based on the radiation pattern of the donor antenna 220 and the serve antenna 230. The repeater system can also include a radiation shield carried by the pole 210 and located between the donor antenna 220 and the server antenna 230 to reduce radiation communicated between the donor antenna 220 and the server antenna 230. In one instance, the donor and/or server antenna 220, 230 can be directional antennas to reduce radiation communicated between the donor antenna 220 and the server antenna 230. The direction of each antenna can be electrically or mechanically steerable to direct the radiation pattern of the donor and/or server antenna 220, 230. For example, the donor antenna can be steerable, wherein the downlink signal strength from one or more base stations are measured and the radiation pattern for the uplink signal is steered in the direction of the strongest downlink signal. In another instance, the donor and/or server antenna 220, 230 can be omnidirectional antennas.

In one aspect, the repeater system can also include a mounting apparatus 270 for securing the pole 210 to a vehicle or structure. The mounting apparatus 270 can be a ratchet mount, a ram mount, a tripod, a stand, or the like. The mounting apparatus 270 can be fixed or movable. In one instance, the mounting apparatus 270, such as a ratchet mount, enables the pole 210 to be rotated to a vertical direction for use with the donor antenna 220 located near a top of the pole 210, and rotated to a horizontal direction for stowage. In one instance, the mounting apparatus 270 allows the pole 210 to be rotatably and/or removably mounted to a marine vessel. In another instance, the mounting apparatus 270 allows the pole 210 to be rotatably and/or removably mounted to a vehicle, such as an emergency response vehicle. The spacing between the mounting apparatus 270 and one or more of the repeater 240, the donor antenna 220 and/or the server antenna 230 can vary based on system requirements.

Figure 3A:
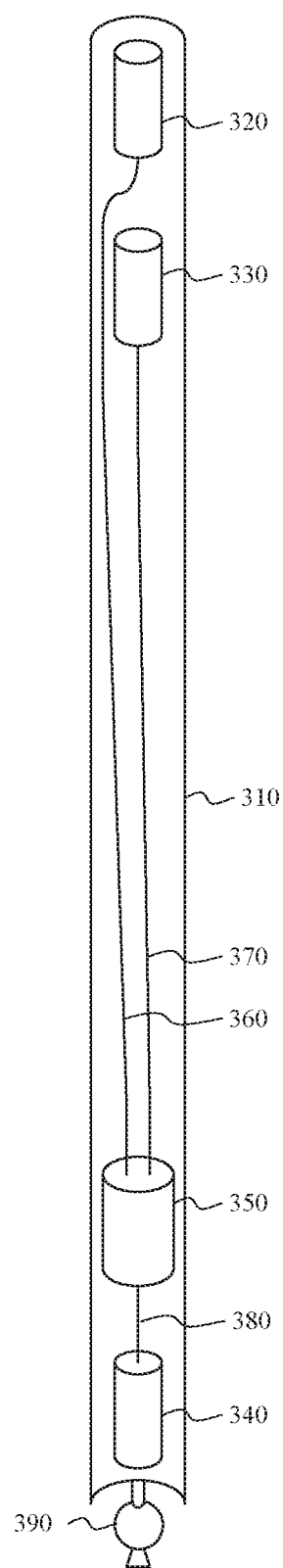
FIGS. 3a and 3b depict a repeater system, in accordance with another example.
Figure 3B:
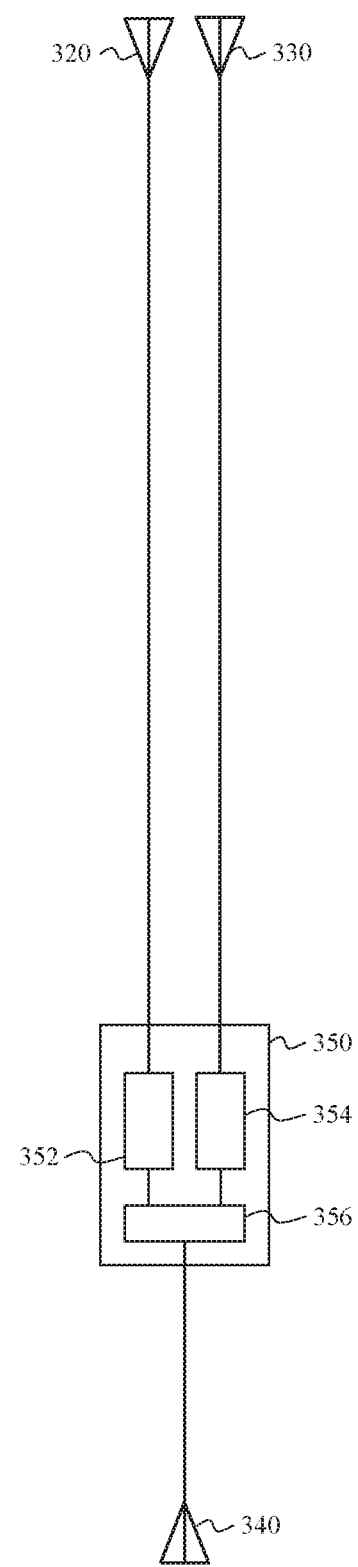

FIGS. 3a and 3b depict a repeater system, in accordance with another example. In the mechanical illustration of FIG. 3a, the repeater system can include a pole 310, an uplink donor antenna 320, a downlink donor antenna 330, a server antenna 340, and a repeater 350. In one aspect, the uplink donor antenna 320 can be configured to transmit uplink signals from the repeater 350 to one or more base stations. The downlink donor antenna 330 can be configured to receive downlink signals from one or more base stations. The server antenna 340 can be configured to transmit and receive uplink and downlink signals between the repeater 350 and one or more user devices.

In one aspect, the repeater 350 can be electrically coupled between the uplink and downlink donor antennas 320, 330 and the server antenna 340. In one instance, the repeater 350 can be electrically coupled by respective cables 360, 370, 380 between the repeater 350 and the uplink and downlink donor antennas 320, 330, and between the repeater 350 and the server antenna 340. The cables 360, 370, 380 can be coaxial cables to reduce coupling between the uplink and downlink donor antennas 320, 330, and the server antenna 340.

In one aspect, the repeater 350 can be configured to amplify one or more RF communication signals, as illustrated in the circuit illustration of FIG. 3b. The repeater 350 can, for example, amplify various types of RF signals, such as cellular telephone, WiFi, or AM/FM radio signals. In one instance, an uplink amplifier 352 can be configured to amplify signals in one or more uplink bands, and a downlink amplifier 354 can be configured to amplify signals in one or more downlink bands. One or more duplexers and/or couplers 356 can be configured to multiplex, demultiplex and or couple the uplink and downlink signals between the uplink and downlink amplifiers 352, 354 and the uplink and downlink donor antennas 320, 330 respectively, and between the uplink and downlink amplifiers 352, 354 and the server antenna 340. However, with the use of uplink and downlink antennas 320, 330, the duplexer or coupler between the uplink and downlink amplifiers 352, 354 and the uplink and downlink donor antennas 320, 330 can be eliminated. Eliminating the duplexer or coupler between the amplifiers 352, 354 and the uplink and downlink antennas 320, 330 can reduce the insertion loss by 2-3 decibels (dBs), thereby increasing output power by 2-3 dB and decreasing the noise factor by 2-3 db.

Referring again to FIG. 3a, the pole 310 can be any long, relatively slender mechanical support structure. The pole 310 can have a form factor of a cylinder (right circular, elliptic, parabolic, hyperbolic), rectangular prism, triangular prism, pentagonal prism, hexagonal prism, or the like. In one aspect, the pole 310 can be non-conductive. In another aspect, the pole 310 can include one or more metallic portions, such as one or more of caps, fasteners and/or adapters. For example, the pole 310 can include a metal cap coupled to an electrical ground for lightning protection.

In one aspect, the uplink and downlink donor antennas 320, 330, server antenna 340 and repeater 350 are carried by the pole 310. In one instance, the server antenna 340 and the repeater 350 can be fixably mounted to a first side of the pole 310 and the uplink and downlink donor antenna 320, 330 can be fixably mounted to a second side of the pole 310 that is opposite to the first side of the pole 310. The uplink and downlink donor antennas 320, 330 mounted at the second side of the pole 310 can correspond to the top of the pole 310. Mounting the server antenna 340 and repeater 350 at the second side of the pole 310 can correspond to the bottom of the pole. It is to be appreciated that with the server antenna 340 and repeater 350 mounted toward the bottom of the pole 310 and the uplink and downlink donor antennas 320, 330 mounted toward the top of the pole 320, in most cases there will be increased mass at the bottom of the pole 210 resulting in a lower center of gravity. The lower center of gravity can resist torque on the pole 310 from wind. In another instance, the uplink and downlink donor antennas 320, 330 and the repeater 340 can be fixably mounted to a first side of the pole 310, and the server antenna 340 can be fixably mounted to a second side of the pole 310 that is opposite to the first side of the pole 310. Mounting the uplink and downlink donor antenna 320, 330, and the repeater 340 near each other at the first side of the pole 310 can advantageously reduce transmission losses. In one instance, the uplink and downlink donor antennas 320, 330, the server antenna 340, and the repeater 350, are encompassed by the pole 310. The uplink and downlink donor antennas 320, 330, the server antenna 340 and the repeater 350 can be encompassed by the pole 310, by integrating the uplink and downlink donor antennas 320, 330, the server antenna 340 and the repeater 350 with the pole 310, or mounting the uplink and downlink donor antennas 320, 330, the server antenna 340, and the repeater 350 inside the pole.

In one aspect, a radiation pattern of the uplink donor antenna 320 can be configured to reduce radiation directed toward the server antenna 340 to minimize feedback from the server antenna 340, through the repeater 350, to the uplink donor antenna 320. A radiation pattern of the server antenna 340 can also be configured to reduce radiation directed toward the downlink donor antenna 330 to minimize feedback from the downlink donor antenna 330, through the repeater 350, to the server antenna 230. In one instance, the uplink and downlink donor antennas 320, 330 and the server antenna 340 can be located at fixed distances from each other to reduce feedback based on their radiation patterns. The repeater system can also include a radiation shield carried by the pole 310 and located between the uplink and downlink donor antennas 320, 330 and the server antenna 340. In one instance, one or more of the uplink donor antenna 320, the downlink donor antenna 330 and/or server antenna 340 can be directional antennas. The directional antenna can be electrically or mechanically steerable to direct the radiation pattern of the uplink donor antenna 320, downlink donor antenna 330 and/or server antenna 340. For example, the donor antenna can be steerable, wherein the downlink signal strength from one or more base stations are measured and the radiation pattern for the uplink signal is steered in the direction of the strongest downlink signal. In another instance, one or more of the uplink donor antenna 320, downlink donor antenna 330 and/or server antenna 340 can be omnidirectional antennas.

In one aspect, the repeater system can also include a mounting apparatus 390 for securing the pole 310 to a vehicle or structure. The mounting apparatus 390 can be a ratchet mount, a ram mount, a tripod, a stand, or the like. The mounting apparatus 390 can be fixed or movable. In one instance, the mounting apparatus 390, such as a ratchet mount, enables the pole 310 to be rotated to a vertical direction for use with the uplink and downlink donor antennas 320, 330 located near a top of the pole 310, and rotated to a horizontal direction for stowage. In one instance, the mounting apparatus 390 allows the pole 310 to be rotatably and/or removably mounted to a marine vessel. In another instance, the mounting apparatus 390 allows the pole 310 to be rotatably and/or removably mounted to a vehicle, such as an emergency response vehicle.

Figure 4A:
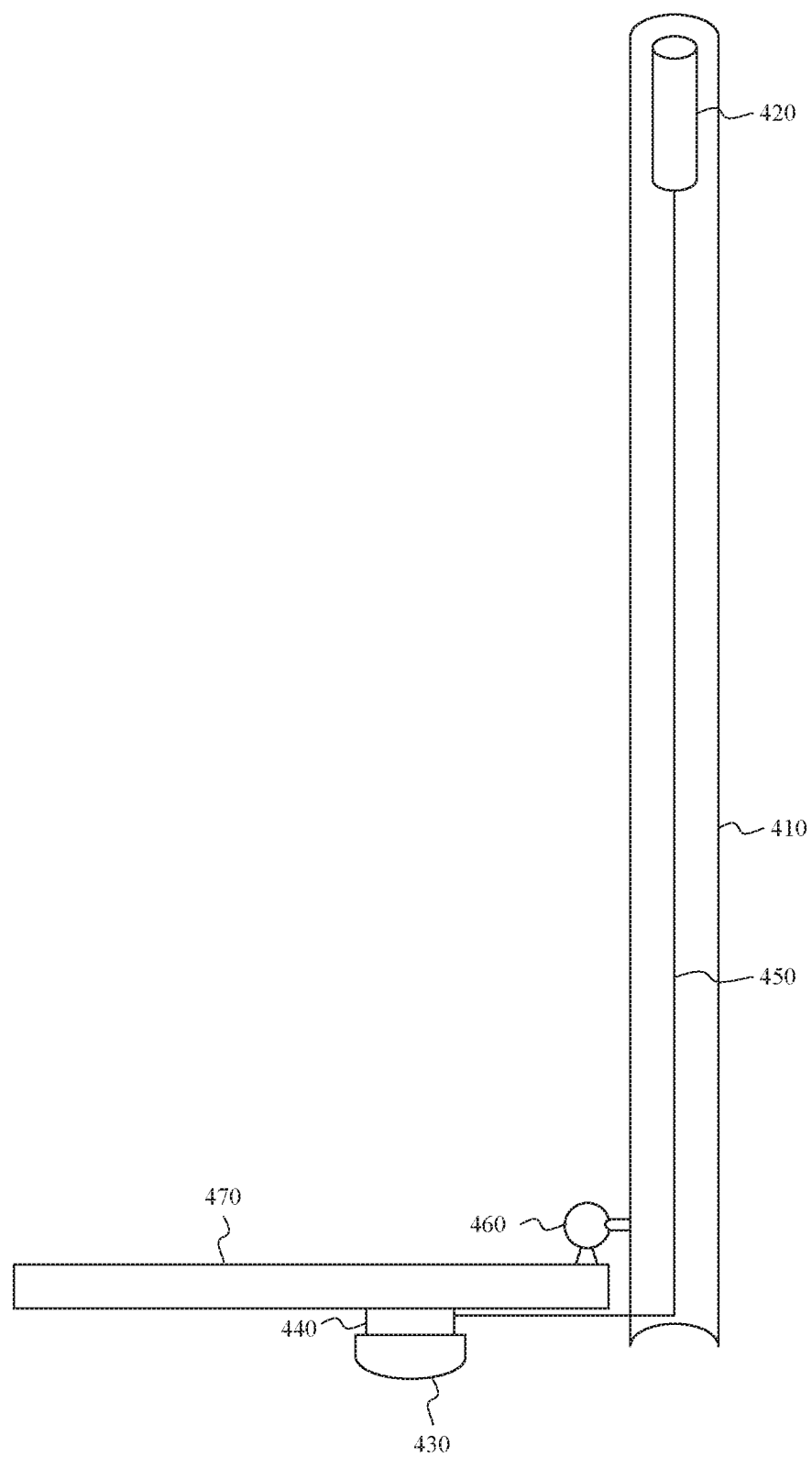
FIGS. 4a and 4b depict a repeater system, in accordance with another example.

FIG. 4a depicts a repeater system, in accordance with another example. The repeater system can include a pole 410, a donor antenna 420, a server antenna 430, and a repeater 440. In one aspect, the donor antenna 420 can be configured to transmit and receive uplink and downlink signals between the repeater 440 and one or more base stations. The server antenna 430 can be configured to transmit and receive uplink and downlink signals between the repeater 440 and one or more user devices.

In one aspect, the repeater 440 can be electrically coupled between the donor antenna 420 and the server antenna 430. In one instance, the repeater 440 can be electrically coupled to the donor antenna 420 by a cable 450. The cable 450 can be a coaxial cable to reduce coupling between the donor antenna 420 and the server antenna 430.

The pole 410 can be any long, relatively slender mechanical support structure. The pole 410 can have a form factor of a cylinder (right circular, elliptic, parabolic, hyperbolic), rectangular prism, triangular prism, pentagonal prism, hexagonal prism, or the like. In one aspect, the pole 410 can be non-conductive. In another aspect, the pole 410 can include one or more metallic portions, such as one or more of caps, fasteners and/or adapters. For example, the pole 410 can include a metal cap coupled to an electrical ground for lightning protection.

In one aspect, the donor antenna 420 can be carried by the pole 410. In one instance, the server antenna 430 and the repeater 440 can be removably couplable to a first side of the pole 410 and the donor antenna 420 can be fixably mounted to a second side of the pole 410 that is opposite to the first side of the pole 420. The donor antenna 420 mounted at the second side of the pole 410 can correspond to the top of the pole. The server antenna 430 and repeater 440 can be removed from the first side of the pole 410 and mounted on a structure 460 in a desired location adjacent to the pole 410. For example, the server antenna 430 and repeater 440 can be removed from the pole 410 and mounted in a crew compartment of a marine vessel. In another example, the server antenna 430 and repeater 440 can be removed from the pole 410 and mounted in an emergency response command center or on an emergency response vehicle. In one instance, the donor antenna 420 is encompassed by the pole 410. The donor antenna 420 can be encompassed by the pole 410, by integrating the donor antenna 420 with the pole 410, or mounting the donor antenna 420 inside the pole 410.

In one aspect, a radiation pattern of the donor antenna 420 can be configured to reduce radiation directed toward the server antenna 430 to minimize feedback from the server antenna 430, through the repeater 440, to the donor antenna 420. A radiation pattern of the server antenna 430 can also be configured to reduce radiation directed toward the donor antenna 420 to minimize feedback from the donor antenna 420, through the repeater 440, to the server antenna 430. The repeater system can also include a radiation shield carried by the pole 410 and located between the donor antenna 420 and the server antenna 430. In one instance, the donor and/or server antenna 420, 430 can be directional antennas. The direction antenna can be electrically or mechanically steerable to direct the radiation pattern of the donor and/or server antenna 420, 430. For example, the donor antenna 420 can be steerable, wherein the downlink signal strength from one or more base stations are measured and the radiation pattern for the uplink signal is steered in the direction of the strongest downlink signal. In another instance, the donor and/or server antenna 420, 430 can be omnidirectional antennas.

In one aspect, the repeater system can also include a mounting apparatus 460 for securing the pole 410 to a vehicle 470 or structure. The mounting apparatus 460 can be a ratchet mount, a ram mount, a tripod, a stand, or the like. The mounting apparatus 460 can be fixed or movable. In one instance, the mounting apparatus 460, such as a ratchet mount, enables the pole 410 to be rotated to a vertical direction for use with the donor antenna 420 located near a top of the pole 410, and rotated to a horizontal direction for stowage. In one instance, the mounting apparatus 460 allows the pole 410 to be rotatably and/or removably mounted to a marine vessel. In another instance, the mounting apparatus 460 allows the pole 410 to be rotatably and/or removably mounted to a vehicle, such as an emergency response vehicle.

Figure 4B:
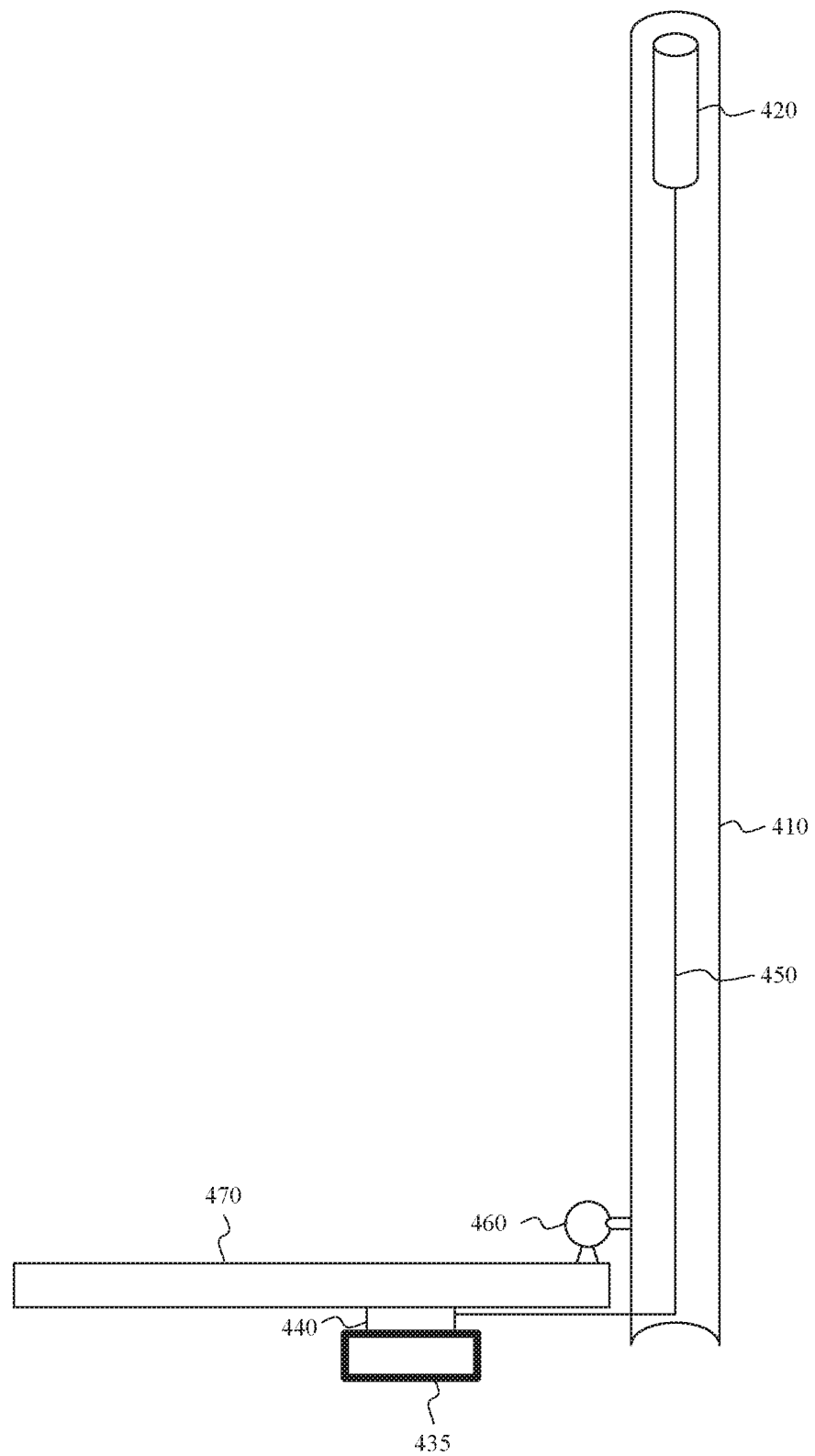

FIG. 4b depicts a repeater system, in accordance with another example. The repeater system can include a pole 410, a donor antenna 420, a cradle 435, and a repeater 440. In one aspect, the repeater system can also include a mounting apparatus 460 for securing the pole 410 to a vehicle 470 or structure. In one aspect, the donor antenna 420 can be configured to transmit and receive uplink and downlink signals between the repeater 440 and one or more base stations. The cradle 435 can be carried about the pole 410, i.e. coupled to the pole 410, coupled adjacent to the pole 410, or within a fixed radius of up to 20 feet from the pole 410. The cradle 435 can have an interface capable of selectively carrying a UE and a server antenna. The server antenna can be configured to wirelessly couple one or more radio frequency (RF) communication signals to a UE carried by the interface of the cradle 435. The cradle 435 can be coupled to the repeater 440 via a coaxial cable with a length of between 0.5 feet and 40 feet. The repeater 440 can be coupled to the donor antenna 420 via a coaxial cable 450. The repeater can be integrated with the cradle. Alternatively, the repeater can be separate from the cradle and connected to the server antenna in the cradle via a wired or wireless connection. The maximum gain of the repeater can automatically adjust based on whether the UE is placed in the cradle or not.

In one aspect, the maximum gain of repeater can be 23 decibels (dB) when the cradle is carrying a UE. Alternatively, a greater or lesser gain may be used based on government standards and regulations for the country in which the repeaters is configured to operate. In addition, in one aspect, the minimum distance of the cradle 435 and/or the server antenna from a user can be 8 inches or 20 centimeters (cm). In another aspect, the maximum gain of the cradle 435 and/or the server antenna and/or the repeater can be 50 dB when the cradle 435 is not carrying the UE and the UE is within a radius of up to 20 feet of the server antenna. The maximum gain of the repeater can automatically adjust based on whether the UE is placed in the cradle or not. Thus the repeater system can provide a signal boost to the UE and signal coverage to a larger area, such as the area covered by a recreational vehicle (RV). In another aspect, the maximum gain of the server antenna and/or the repeater can be between 65-72 dB when the cradle 435 is not carrying the UE and the server antenna is at a fixed location. Use of the cradle 435 coupled to the server antenna at a lower gain, i.e. 23 dB or 50 dB, can limit antenna-to-antenna feedback, such as feedback between the server antenna and the donor antenna, that can occur at higher gain levels, i.e. 65-72 dB.

Figure 5A:
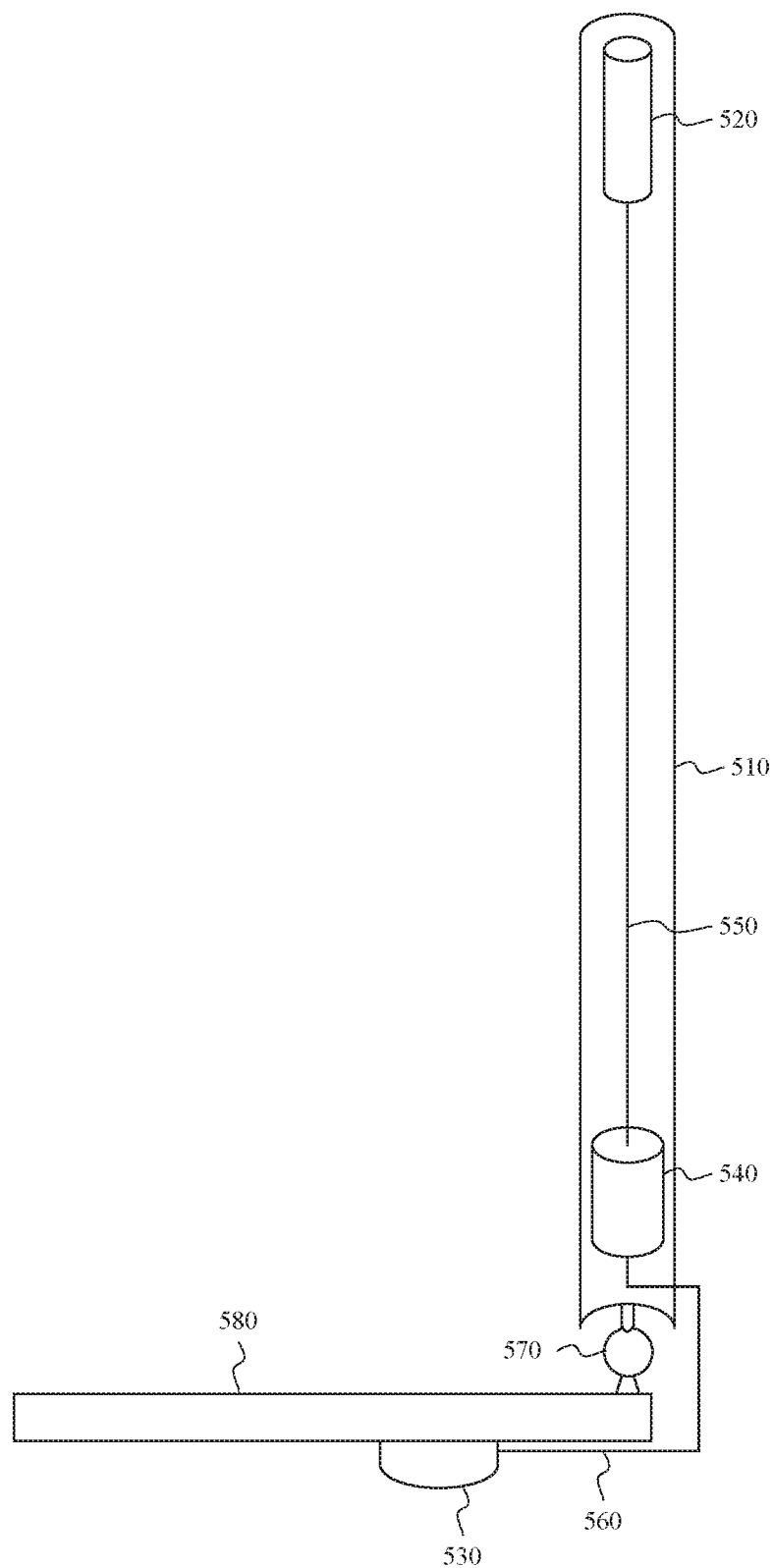
FIGS. 5a and 5b depict a repeater system, in accordance with another example.

FIG. 5 depicts a repeater system, in accordance with another example. The repeater system can include a pole 510, a donor antenna 520, a server antenna 530, and a repeater 540. In one aspect, the donor antenna 520 can be configured to transmit and receive uplink and downlink signals between the repeater 540 and one or more base stations. The server antenna 530 can be configured to transmit and receive uplink and downlink signals between the repeater 540 and one or more user devices.

In one aspect, the repeater 540 can be electrically coupled between the donor antenna 520 and the server antenna 530. In one instance, the repeater 540 can be electrically coupled by respective cables 550, 560 between the repeater 540 and the donor antenna 520, and between the repeater 540 and the server antenna 530. The cables 550, 560 can be coaxial cables to reduce coupling between the donor antenna 520 and the server antenna 530.

The pole 510 can be any long, relatively slender mechanical support structure. The pole 510 can have a form factor of a cylinder (right circular, elliptic, parabolic, hyperbolic), rectangular prism, triangular prism, pentagonal prism, hexagonal prism, or the like. In one aspect, the pole 510 can be non-conductive. In another aspect, the pole 10 can include one or more metallic portions, such as one or more of caps, fasteners and/or adapters. For example, the pole 510 can include a metal cap coupled to an electrical ground for lightning protection.

In one aspect, the donor antenna 520 and repeater 540 are carried by the pole 510. In one instance, the repeater 540 can be fixably mounted to a first side of the pole 510 and the donor antenna 520 can be fixably mounted to a second side of the pole 510 that is opposite to the first side of the pole 510. The donor antenna 520 mounted at the second side of the pole 510 can correspond to the top of the pole. Mounting the repeater 540 at the second side of the pole 510 can correspond to the bottom of the pole 510. It is to be appreciated that with the repeater 540 mounted toward the bottom of the pole and the donor antenna 520 mounted toward the top of the pole 510, in most cases there will be increased mass at the bottom of the pole 510 resulting in a lower center of gravity. The lower center of gravity can resist torque on the pole 510 from wind. The server antenna 530 can optionally be removably couplable to the first side of the pole 510. The server antenna 530 can, therefore, be removed from the first side of the pole 510 and mounted on a structure 570 in a desired location adjacent the pole 510. For example, the server antenna 530 can be removed from the pole 510 and mounted in a crew compartment of a marine vessel. In another example, the server antenna 530 can be removed from the pole 510 and mounted in an emergency response command center or on an emergency response vehicle. In another instance, the donor antenna 520 and the repeater 540 can be fixably mounted to a first side of the pole 510, and the server antenna 530 can be removably couplable to a second side of the pole 510 that is opposite to the first side of the pole 510. Mounting the donor antenna 520 and the repeater 540 near each other at the first side of the pole 210 can advantageous reduce transmission losses. In one instance, the donor antenna 520, and the repeater 540 are encompassed by the pole 210. The donor antenna 520 and the repeater 540 can be encompassed by the pole 510, by integrating the donor antenna 520 and the repeater 540 with the pole 510, or mounting the donor antenna 520 and the repeater 540 inside the pole 510.

In one aspect, a radiation pattern of the donor antenna 520 can be configured to reduce radiation directed toward the server antenna 530 to minimize feedback from the server antenna 530, through the repeater 540, to the donor antenna 520. A radiation pattern of the server antenna 530 can also be configured to reduce radiation directed toward the donor antenna 520 to minimize feedback from the donor antenna 520, through the repeater 540, to the server antenna 530. The repeater system can also include a radiation shield carried by the pole 510 and located between the donor antenna 520 and the server antenna 530. In one instance, the donor and/or server antenna 520, 530 can be directional antennas. The direction antenna can be electrically or mechanically steerable to direct the radiation pattern of the donor and/or server antenna 520, 530. For example, the donor antenna can be steerable, wherein the downlink signal strength from one or more base stations are measured and the radiation pattern for the uplink signal is steered in the direction of the strongest downlink signal. In another instance, the donor and/or server antenna 520, 530 can be omnidirectional antennas.

In one aspect, the repeater system can also include a mounting apparatus 570 for securing the pole 510 to a vehicle 580 or structure. The mounting apparatus 570 can be a ratchet mount, a ram mount, a tripod, a stand, or the like. The mounting apparatus 570 can be fixed or movable. In one instance, the mounting apparatus 570, such as a ratchet mount, enables the pole 510 to be rotated to a vertical direction for use with the donor antenna 520 located near a top of the pole 510, and rotated to a horizontal direction for stowage. In one instance, the mounting apparatus 570 allows the pole 510 to be rotatably and/or removably mounted to a marine vessel. In another instance, the mounting apparatus 570 allows the pole 510 to be rotatably and/or removably mounted to a vehicle, such as an emergency response vehicle.

Figure 5B:
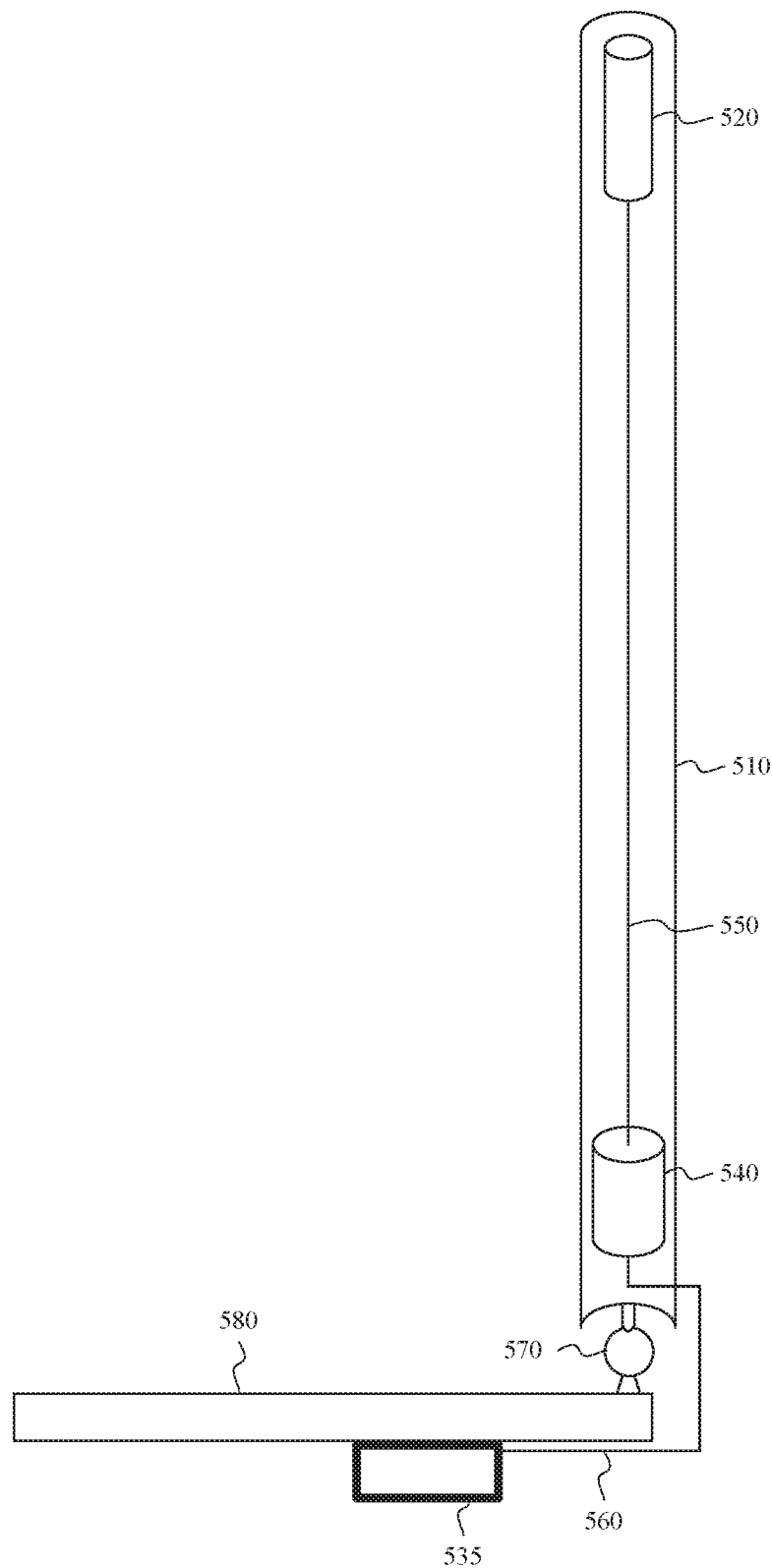

FIG. 5b depicts a repeater system, in accordance with another example. The repeater system can include a pole 510, a donor antenna 520, a cradle 535, and a repeater 540. In one aspect, the repeater system can also include a mounting apparatus 570 for securing the pole 510 to a vehicle 580 or structure. In one aspect, the donor antenna 520 can be configured to transmit and receive uplink and downlink signals between the repeater 540 and one or more base stations. The cradle 535 can be carried about the pole 510, i.e. coupled to the pole 510, coupled adjacent to the pole 510, or within a fixed radius of up to 40 feet from the pole 510. The cradle 535 can have an interface capable of selectively carrying a UE and a server antenna. The server antenna can be configured to wirelessly couple one or more radio frequency (RF) communication signals to a UE carried by the interface of the cradle 535. The cradle 535 can be coupled to the repeater 540 via a coaxial cable with a length of between 0.5 feet and 40 feet. The repeater 540 can be coupled to the donor antenna 520 via a coaxial cable 550.

In one aspect, the maximum gain of the repeater can be 23 decibels (dB), or another desired level based on a government regulation or standard, when the cradle is carrying a UE. In addition, in one aspect, the maximum range of the cradle 535 and/or the server antenna can be 8 inches or 20 centimeters (cm) based on the gain of 23 dB. In another aspect, the maximum gain of the cradle 535 and/or the server antenna and/or the repeater can be 50 dB when the cradle 535 is not carrying the UE and the UE is within a radius of up to 20 feet of the server antenna. Thus the repeater system can provide a signal boost to the UE and signal coverage to a larger area, such as the area covered by a recreational vehicle (RV). In another aspect, the maximum gain of the server antenna and/or the repeater can be between 65-72 dB when the cradle 535 is not carrying the UE and the server antenna is at a fixed location. Use of the cradle 535 coupled to the server antenna at a lower gain, i.e. 23 dB or 50 dB, can limit antenna-to-antenna feedback, such as feedback between the server antenna and the donor antenna, that can occur at higher gain levels, i.e. 65-72 dB. The maximum gain of the repeater can automatically adjust based on whether the UE is placed in the cradle or not.

Figure 6A:
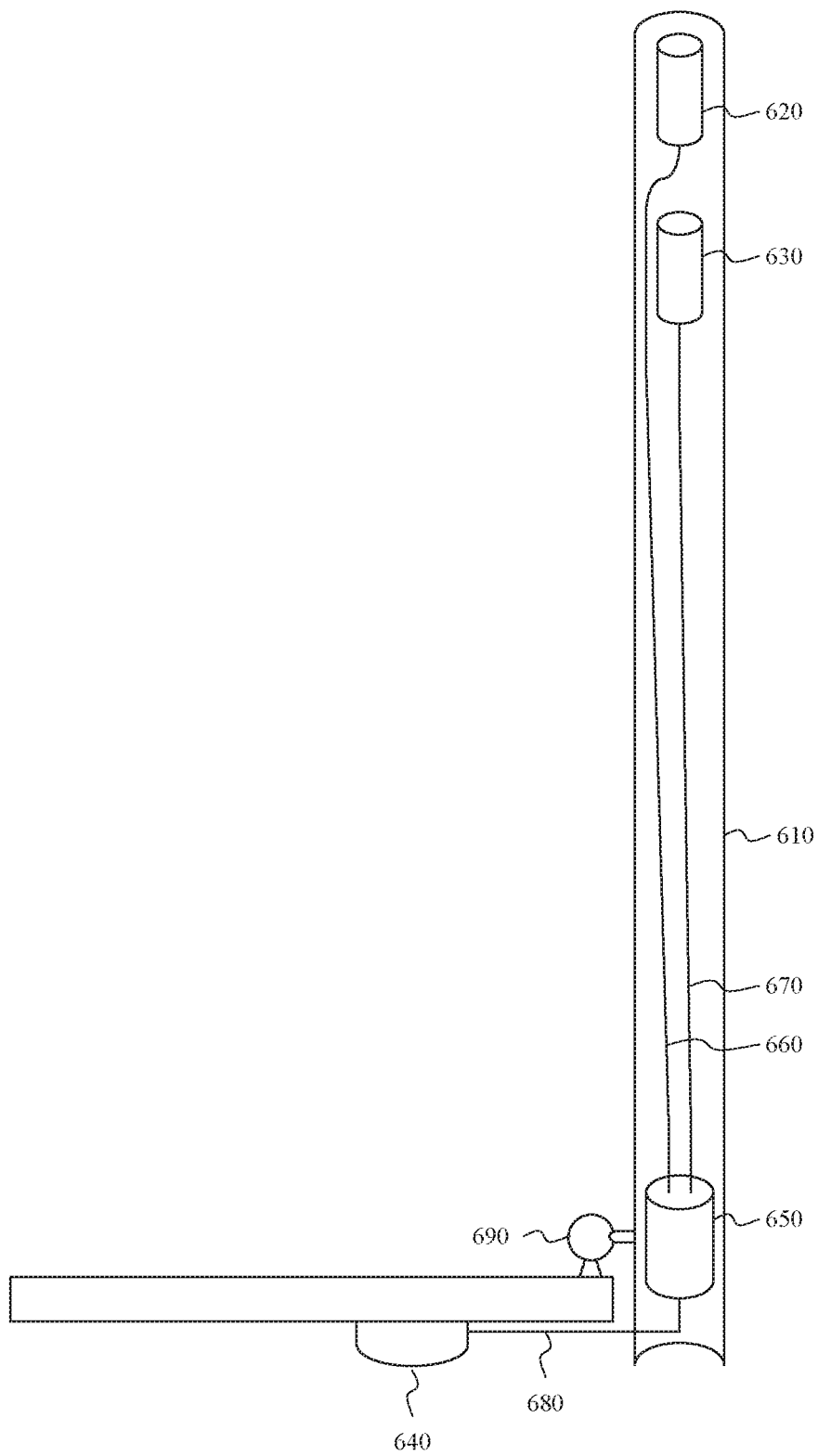
FIGS. 6a and 6b depict a repeater system, in accordance with another example.

FIG. 6 depicts a repeater system, in accordance with another example. The repeater system can include a pole 610, an uplink donor antenna 620, a downlink donor antenna 630, a server antenna 640, and a repeater 650. In one aspect, the uplink donor antenna 620 can be configured to transmit uplink signals from the repeater 650 to one or more base stations. The downlink donor antenna 630 can be configured to receive downlink signals from one or more based stations. The server antenna 640 can be configured to transmit and receive uplink and downlink signals between the repeater 650 and one or more user devices.

In one aspect, the repeater 650 can be electrically coupled between the uplink and downlink donor antennas 620, 630 and the server antenna 640. In one instance, the repeater 650 can be electrically coupled by respective cables 660, 670, 680 between the repeater 650 and the uplink and downlink donor antennas 620, 630, and between the repeater 650 and the server antenna 640. The cables 660, 670, 680 can be coaxial cables to reduce coupling between the uplink and downlink donor antennas 620, 630, and the server antenna 640.

In one aspect, the pole 610 can be any long, relatively slender mechanical support structure. The pole 610 can have a form factor of a cylinder (right circular, elliptic, parabolic, hyperbolic), rectangular prism, triangular prism, pentagonal prism, hexagonal prism, or the like. In one aspect, the pole 610 can be non-conductive. In another aspect, the pole 610 can include one or more metallic portions, such as one or more of caps, fasteners and/or adapters. For example, the pole 610 can include a metal cap coupled to an electrical ground for lightning protection.

In one aspect, the uplink and downlink donor antennas 620, 630 and repeater 650 can be carried by the pole 610. In one instance, the repeater 650 can be fixably mounted to a first side of the pole 610 and the uplink and downlink donor antenna 620, 630 can be fixably mounted to a second side of the pole 610 that is opposite to the first side of the pole 10. The uplink and downlink donor antennas 620, 630 mounted at the second side of the pole 210 can correspond to the top of the pole 610. Mounting the repeater 650 at the second side of the pole 610 can correspond to the bottom of the pole. It is to be appreciated that with the repeater 650 mounted toward the bottom of the pole 610 and the uplink and downlink donor antennas 620, 630 mounted toward the top of the pole 620, in most cases there will be increased mass at the bottom of the pole 610 resulting in a lower center of gravity and resistance to torque on the pole 610 from wind. The server antenna 630 can optionally be removably couplable to the first side of the pole 610. The server antenna 630 can, therefore, be removed from the first side of the pole 610 and mounted on a structure in a desired location adjacent the pole 610. For example, the server antenna 630 can be removed from the pole 610 and mounted in a crew compartment of a marine vessel. In another example, the server antenna 630 can be removed from the pole 610 and mounted on an emergency response command center. In another instance, the uplink and downlink donor antennas 620, 630 and the repeater 650 can be fixably mounted to a first side of the pole 610, and the server antenna 630 can be removably couplable to a second side of the pole 610 that is opposite to the first side of the pole 610. Mounting the uplink and downlink donor antenna 620, 630 and the repeater 650 near each other at the first side of the pole 610 can advantageously reduce transmission losses. In one instance, the uplink and downlink donor antennas 620, 630 and the repeater 650, are encompassed by the pole 610. The uplink and downlink donor antennas 620, 630 and the repeater 650 can be encompassed by the pole 610, by integrating the uplink and downlink donor antennas 620, 630 and the repeater 650 with the pole 610, or mounting the uplink and downlink donor antennas 620, 630 and the repeater 360 inside the pole.

In one aspect, a radiation pattern of the uplink donor antenna 620 can be configured to reduce radiation directed toward the server antenna 640 to minimize feedback from the server antenna 640, through the repeater 650, to the uplink donor antenna 620. A radiation pattern of the server antenna 640 can also be configured to reduce radiation directed toward the downlink donor antenna 630 to minimize feedback from the downlink donor antenna 630, through the repeater 650, to the server antenna 630. In one instance, the uplink and downlink donor antennas 620, 630 and the server antenna 640 can be located at fixed distances from each other to reduce feedback based on their radiation patterns. The repeater system can also include a radiation shield carried by the pole 610 and located between the uplink and downlink donor antennas 620, 630 and the server antenna 640. In one instance, one or more of the uplink donor antenna 620, the downlink donor antenna 630 and/or server antenna 640 can be directional antennas. The directional antenna can be electrically or mechanically steerable to direct the radiation pattern of the uplink donor antenna 620, downlink donor antenna 630 and/or server antenna 640. For example, the donor antenna can be steerable, wherein the downlink signal strength from one or more base stations are measured and the radiation pattern for the uplink signal is steered in the direction of the strongest downlink signal. In another instance, one or more of the uplink donor antenna 620, downlink donor antenna 630 and/or server antenna 640 can be omnidirectional antennas.

In one aspect, the repeater system can also include a mounting apparatus 690 for securing the pole 610 to a vehicle or structure. The mounting apparatus 690 can be a ratchet mount, a ram mount, a tripod, a stand, or the like. The mounting apparatus 690 can be fixed or movable. In one instance, the mounting apparatus 690, such as a ratchet mount, enables the pole 610 to be rotated to a vertical direction for use with the uplink and downlink donor antennas 620, 630 located near a top of the pole 610, and rotated to a horizontal direction for stowage. In one instance, the mounting apparatus 690 allows the pole 610 to be rotatably and/or removably mounted to a marine vessel. In another instance, the mounting apparatus 690 allows the pole 610 to be rotatably and/or removably mounted to a vehicle, such as an emergency response vehicle.

Figure 6B:
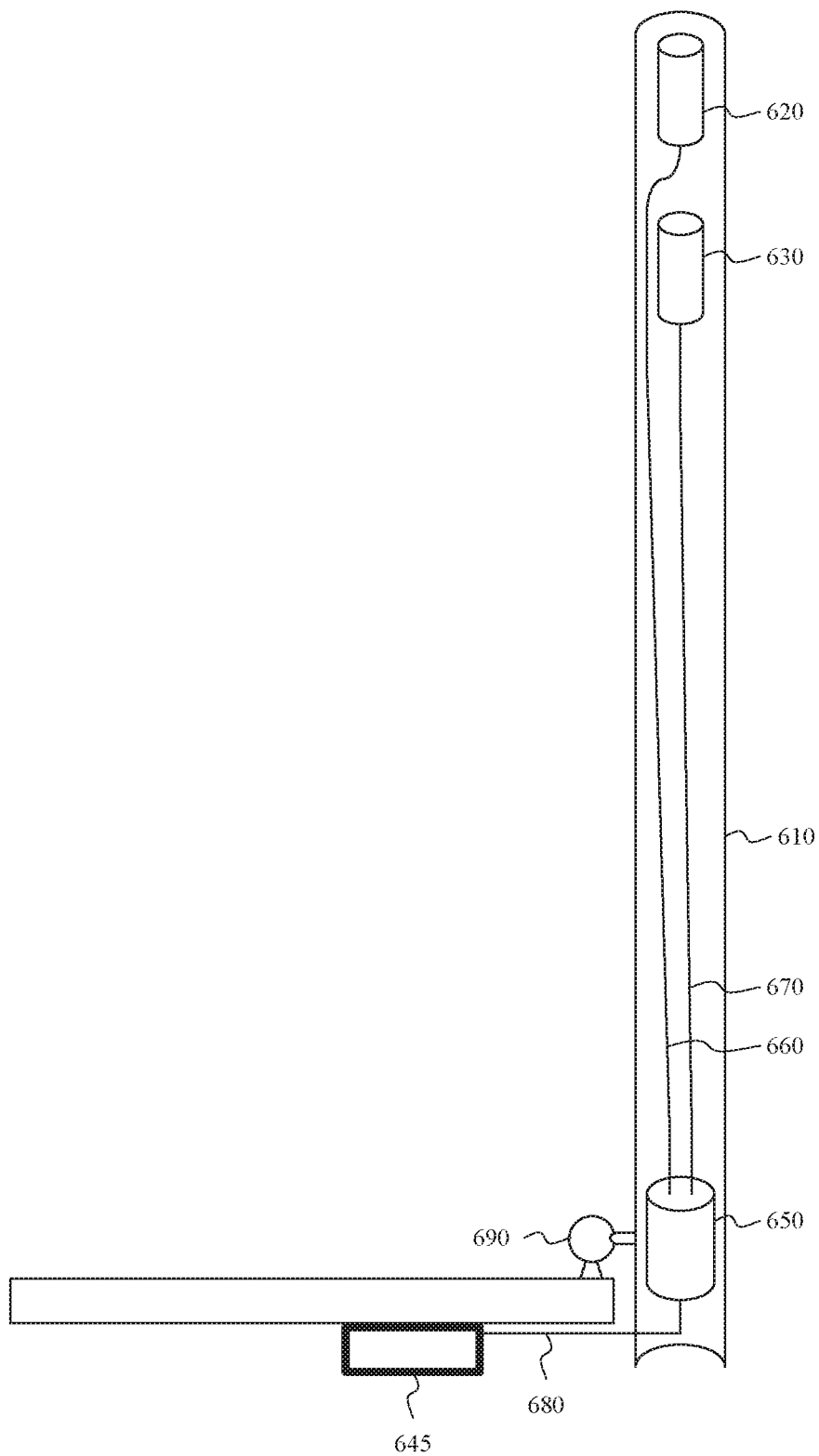

FIG. 6b depicts a repeater system, in accordance with another example. The repeater system can include a pole 610, an uplink donor antenna 620, a downlink donor antenna 630, a cradle 645, and a repeater 650. In one aspect, the repeater system can also include a mounting apparatus 690 for securing the pole 610 to a vehicle 680 or structure. In one aspect, the uplink donor antenna 620 and the downlink donor antenna 630 can be configured to transmit and receive uplink and downlink signals between the repeater 650 and one or more base stations. The cradle 645 can be carried about the pole 610, i.e. coupled to the pole 610, coupled adjacent to the pole 610, or within a fixed radius of up to 20 feet from the pole 610. The cradle 645 can have an interface capable of selectively carrying a UE and a server antenna. The server antenna can be configured to wirelessly couple one or more radio frequency (RF) communication signals to a UE carried by the interface of the cradle 645. The cradle 645 can be coupled to the repeater 650 via a coaxial cable with a length of between 0.5 feet and 40 feet. The repeater 650 can be coupled to the uplink donor antenna 620 or downlink donor antenna 630 via a coaxial cable 660 and 670, respectively.

In one aspect, the maximum gain of the repeater can be 23 decibels (dB), or another desired level based on a government regulation or standard, when the cradle is carrying a UE. In addition, in one aspect, the maximum range of the cradle 645 and/or the server antenna and/or the repeater can be 8 inches or 20 centimeters (cm), based on the gain of 23 dB. In another aspect, the maximum gain of the cradle 645 and/or the server antenna and/or the repeater can be 50 dB when the cradle 645 is not carrying the UE and the UE is within a radius of up to 20 feet of the server antenna. Thus the repeater system can provide a signal boost to the UE and signal coverage to a larger area, such as a recreational vehicle (RV). In another aspect, the maximum gain of the server antenna and/or the repeater can be between 65-72 dB when the cradle 645 is not carrying the UE and the server antenna is at a fixed location. Use of the cradle 645 coupled to the server antenna at a lower gain, i.e. 23 dB or 50 dB, can limit antenna-to-antenna feedback, such as feedback between the server antenna and the donor antenna, that can occur at higher gain levels, i.e. 65-72 dB. The maximum gain of the repeater can automatically adjust based on whether the UE is placed in the cradle or not.

Figure 7:
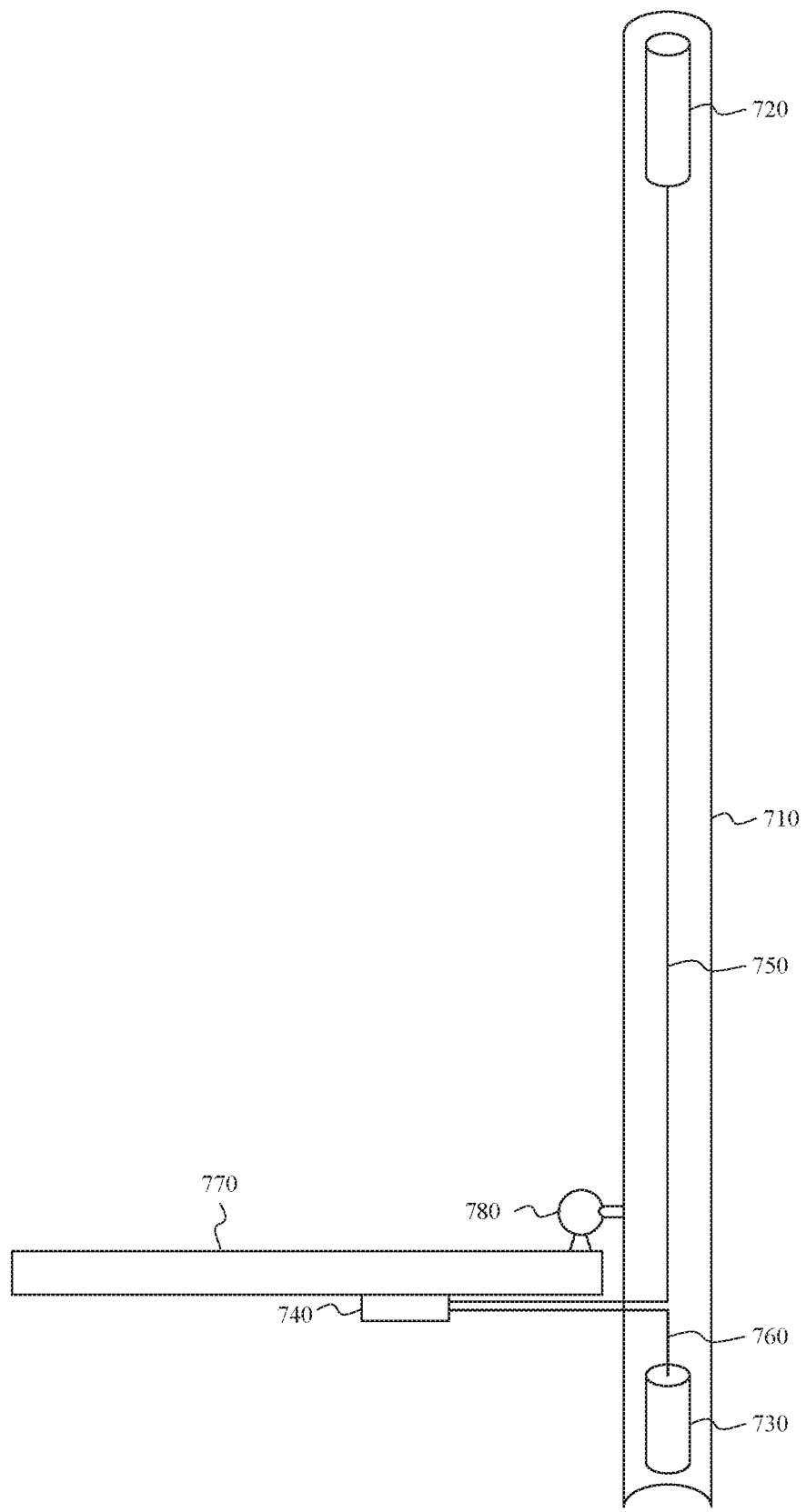
FIG. 7 depicts a repeater system, in accordance with another example.

FIG. 7 depicts a repeater system, in accordance with another example. The repeater system can include a pole 710, a donor antenna 720, a server antenna 730, and a repeater 740. In one aspect, the donor antenna 720 can be configured to transmit and receive uplink and downlink signals between the repeater 740 and one or more base stations. The server antenna 730 can be configured to transmit and receive uplink and downlink signals between the repeater 740 and one or more user devices.

In one aspect, the repeater 740 can be electrically coupled between the donor antenna 720 and the server antenna 730. In one instance, the repeater 740 can be electrically coupled to the donor antenna 720 by a first cable 750 and to the server antenna 730 by a second cable 760. The cables 750, 760 can be coaxial cable to reduce coupling between the donor antenna 720 and the server antenna 730.

The pole 710 can be any long, relatively slender mechanical support structure. The pole 710 can have a form factor of a cylinder (right circular, elliptic, parabolic, hyperbolic), rectangular prism, triangular prism, pentagonal prism, hexagonal prism, or the like. In one aspect, the pole 710 can be non-conductive. In another aspect, the pole 710 can include one or more metallic portions, such as one or more of caps, fasteners and/or adapters. For example, the pole 710 can include a metal cap coupled to an electrical ground for lightning protection.

In one aspect, the donor antenna 720 and server antenna 730 can be carried by the pole 710. In one instance, the server antenna 730 can be fixably mounted to a first side of the pole 710 and the donor antenna 720 can be fixably mounted to a second side of the pole 710 that is opposite to the first side of the pole 720. The donor antenna 720 mounted at the second side of the pole 710 can correspond to the top of the pole. The repeater 740 can be adapted for mounting on a structure 770 in a desired location adjacent to the pole 710. For example, repeater 740 can be mounted in a crew compartment of a marine vessel. In another example, the repeater 740 can be mounted in an emergency response command center or on an emergency response vehicle. In one instance, the donor antenna 720 and server antenna 730 are encompassed by the pole 710. The donor antenna 720 and server antenna 730 can be encompassed by the pole 710, by integrating the donor antenna 720 and server antenna 730 with the pole 710, or mounting the donor antenna 720 and server antenna 730 inside the pole 710.

In one aspect, a radiation pattern of the donor antenna 720 can be configured to reduce radiation directed toward the server antenna 730 to minimize feedback from the server antenna 730, through the repeater 740, to the donor antenna 720. A radiation pattern of the server antenna 730 can also be configured to reduce radiation directed toward the donor antenna 720 to minimize feedback from the donor antenna 720, through the repeater 740, to the server antenna 730. The repeater system can also include a radiation shield carried by the pole 710 and located between the donor antenna 720 and the server antenna 730. In one instance, the donor and/or server antenna 720, 730 can be directional antennas. The direction antenna can be electrically or mechanically steerable to direct the radiation pattern of the donor and/or server antenna 720, 730. For example, the donor antenna 720 can be steerable, wherein the downlink signal strength from one or more base stations are measured and the radiation pattern for the uplink signal is steered in the direction of the strongest downlink signal. In another instance, the donor and/or server antenna 720, 730 can be omnidirectional antennas.

In one aspect, the repeater system can also include a mounting apparatus 780 for securing the pole 710 to a vehicle 770 or structure. The mounting apparatus 780 can be a ratchet mount, a ram mount, a tripod, a stand, or the like. The mounting apparatus 780 can be fixed or movable. In one instance, the mounting apparatus 780, such as a ratchet mount, enables the pole 710 to be rotated to a vertical direction for use with the donor antenna 720 located near a top of the pole 710, and rotated to a horizontal direction for stowage. In one instance, the mounting apparatus 780 allows the pole 710 to be rotatably and/or removably mounted to a marine vessel. In another instance, the mounting apparatus 780 allows the pole 710 to be rotatably and/or removably mounted to a vehicle, such as an emergency response vehicle.

Figure 8A:
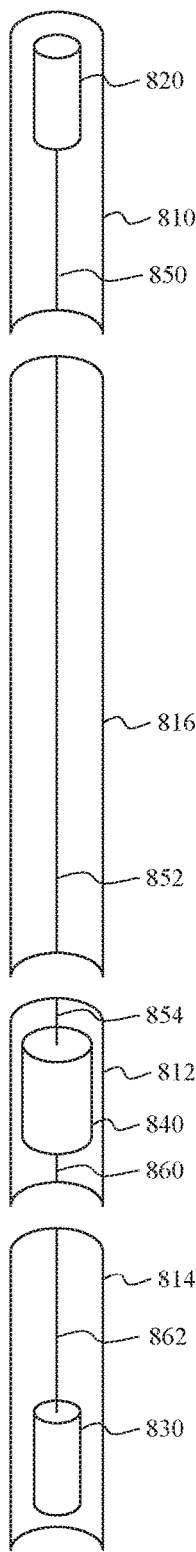
FIGS. 8a, 8b and 8c depict a repeater system, in accordance with another example.
Figure 8B:
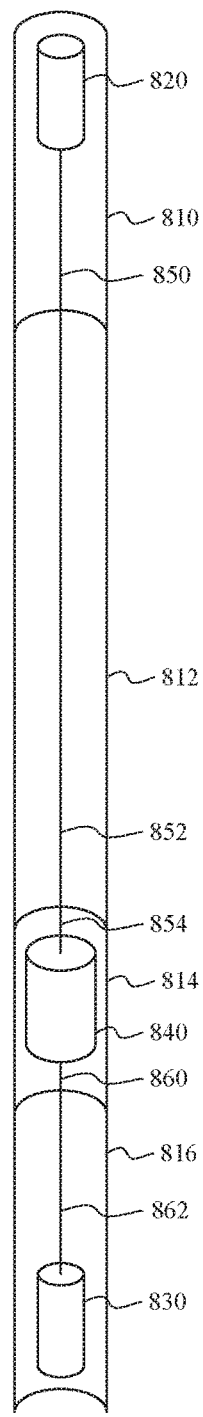
Figure 8C:
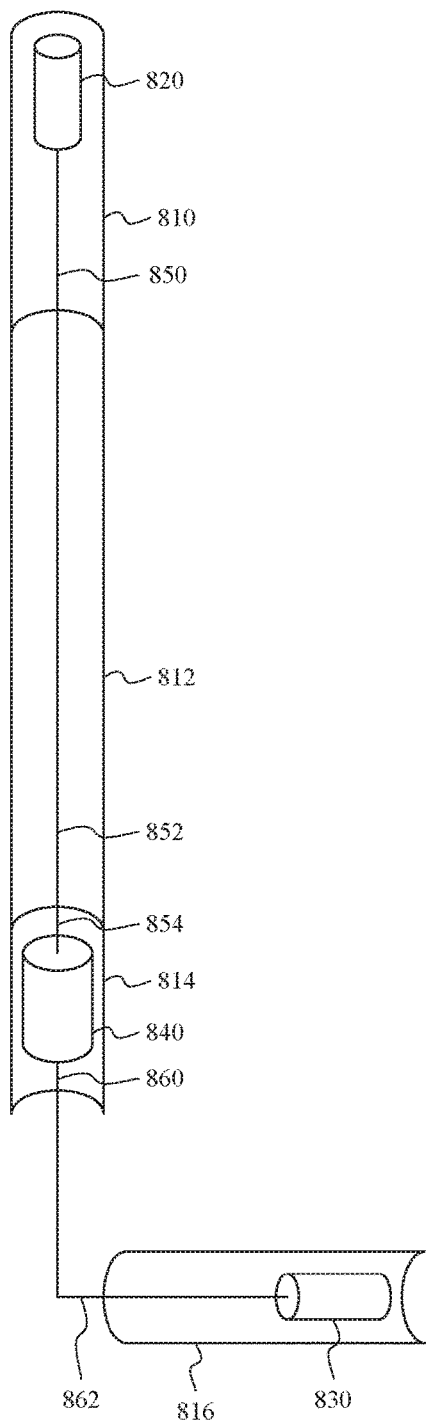

FIGS. 8*a*, 8*b* and 8*c* depict a repeater system, in accordance with another example. The repeater system can include a pole 810-816, one or more donor antennas 820, one or more server antennas 830, and a repeater 840. In one aspect, as illustrated in FIG. 8, the one or more donor antennas 820 can be configured to transmit and receive uplink and downlink signals between the repeater 840 and one or more base stations. The one or more server antennas 830 can be configured to transmit and receive uplink and downlink signals between the repeater 840 and one or more user devices.

In one aspect, the repeater 840 can be electrically coupled between the one or more donor antennas 820 and the one or more server antennas 830. In one instance, the repeater 840 can be electrically coupled by one or more cables 850-854, between the repeater 840 and the one or more donor antennas 820, and one or more cables 860-862 between the repeater 840 and the one or more server antennas 830. The cables 850-854, 860-862 can be coaxial cables to reduce coupling between the donor antenna 820 and the server antenna 830. The corresponding sections of cables 850-854, 860-862 can be coupled together by respective cable connectors.

The pole 810-816 can be any long, relatively slender mechanical support structure. The pole 810-816 can have a form factor of a cylinder (right circular, elliptic, parabolic, hyperbolic), rectangular prism, triangular prism, pentagonal prism, hexagonal prism, or the like. In one aspect, the pole 810-816 can include a plurality of sections that can be removably couplable together, as illustrated in FIGS. 8*a* and 8*b*. The sections of the pole 810-816 can be removably couplable by one or more locking or non-locking, screw-on, snap together, quarter twist or the like couplers. The couplers can be a conductive material such as a metal, or a non-conductive material such as a plastic. In one aspect, the pole 810-816 can be non-conductive. In another aspect, the pole 810-816 can include one or more metallic portions, such as one or more of caps, fasteners and/or adapters. For example, the pole 810-816 can include a metal cap coupled to an electrical ground for lightning protection.

In one implementation, the one or more donor antennas 820 can be carried by a first section of the pole 810, the repeater 840 can be carried by a second section of the pole 812, and the one or more server antennas 830 can be carried by a third section of the pole 816. The pole 810-816 can also include one or more additional sections, such as an extension section 816. The one or more extension sections 816 can increase the height of the one or more donor antennas 820 to increase reception between the repeater 840 and one or more base stations. The one or more extension sections 816 can also increase isolation to minimize feedback from the donor antenna 820, through the repeater 840, to the server antenna 830, and/or from the server antenna 830, through the repeater 840 to the donor antenna 820. In another implementation, the one or more donor antennas 820 and the repeater 840 can be carried by a first section of the pole, and the one or more server antennas 830 can be carried by a second section of the pole.

In one aspect, the section of the pole 814 including the one or more server antennas 830 can optionally be removably couplable to permit the section of the pole 814 including the one or more server antennas 830 to be mounted on a structure in a desired location, as illustrated in FIG. 8*c*. For example, the bottom section of the pole 814 including the one or more server antennas 830 can be removed and mounted in a crew compartment of a marine vessel. In another example, the bottom section of the pole 814 including the one or more server antennas 830 can be removed and mounted in a mobile emergency response command center or on an emergency response vehicle. In one aspect, the one or more donor antennas 820, the one or more serve antennas 830 and the repeater 840 can be encompassed by respective sections of the pole 810-816, by integrating the one or more donor antennas 820, the one or more server antennas 830 and the repeater 840 with respective sections the pole 810-816, or mounting the one or more donor antennas 820, the one or more server antennas 830 and the repeater 840 inside the respective sections of the pole 810-816.

In one aspect, a radiation pattern of the one or more donor antennas 820 can be configured to reduce radiation directed toward the one or more server antennas 830 to minimize feedback. A radiation pattern of the one or more server antennas 830 can also be configured to reduce radiation directed toward the one or more donor antennas 820 to minimize feedback. The repeater system can also include a radiation shield carried by the pole 810-816 and located between the one or more donor antennas 820 and the one or more server antennas 830. In one instance, one or more of the donor antennas 820 and/or one or more of the server antennas 830 can be directional antennas. The direction antenna can be electrically or mechanically steerable to direct the radiation pattern of the one or more donor and/or server antennas 820, 830. For example, the donor antenna can be steerable, wherein the downlink signal strength from one or more base stations are measured and the radiation pattern for the uplink signal is steered in the direction of the strongest downlink signal. In another instance, the one or more donor antennas 820 and/or the one or more server antennas 830 can be omnidirectional antennas.

In one aspect, the repeater system can also include a mounting apparatus for securing one or more sections of the pole 810-816 to a vehicle or structure. The mounting apparatus can be a ratchet mount, a ram mount, a tripod, a stand, or the like. The mounting apparatus can be fixed or movable. In one instance, the mounting apparatus, such as a ratchet mount, can enable one or more sections of the pole 810-816 to be rotated to a vertical direction for use with the donor antenna 820 located near a top of the pole 810, and rotated to a horizontal direction for stowage. In one instance, the mounting apparatus allows the pole 810-816 to be rotatably and/or removably mounted to a marine vessel. In another instance, the mounting apparatus allows the pole 810-816 to be rotatably and/or removably mounted to a vehicle, such as an emergency response vehicle.

Figure 9:
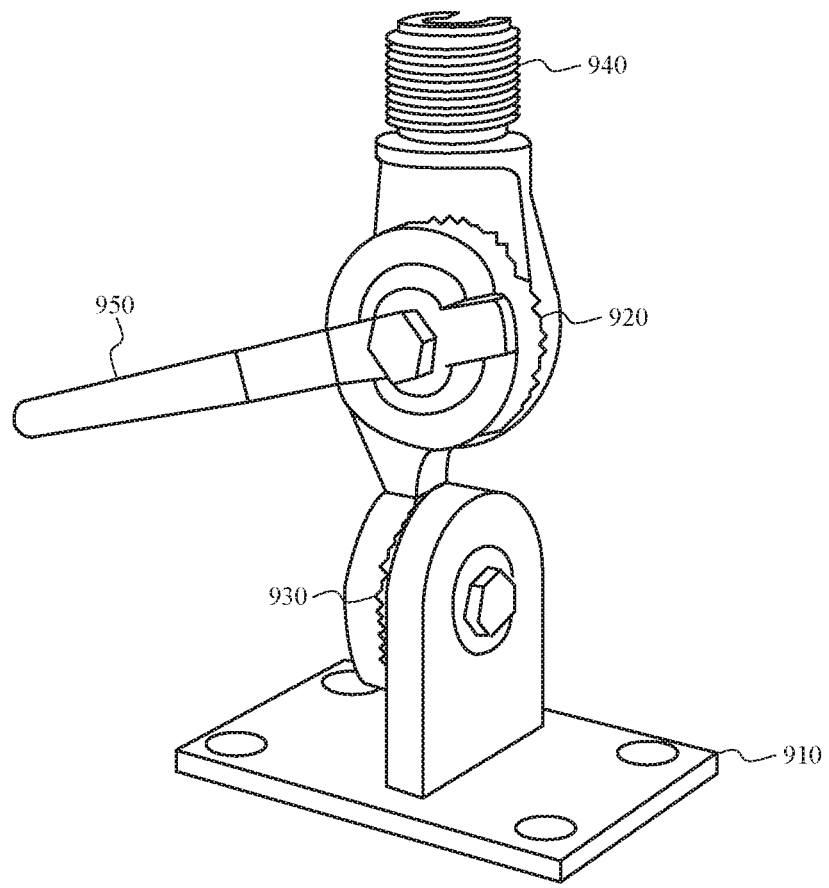
FIG. 9 depicts a ratchet mount, in accordance with an example.

FIG. 9 depicts a ratchet mount, in accordance with an example. The ratchet mount can be utilized to secure the pole of the repeater system to a vehicle or structure. The ratchet mount can include a base 910, one or more swiveling ratchet points 920, 930, and a threaded coupler 940. The threaded coupler 940 can removably couple to the pole, and the base 910 can be affixed to the vehicle or structure. The one or more swiveling ratchet points 920, 930 can each include a plurality of teeth on mating surfaces that are engaged by rotation of a handle 950 or other tightening means. The one or more swiveling ratchet points 920, 930 can be configured for quickly raising and lowering the pole one or more directions of rotation.

Embodiments of the repeater system advantageously integrate one or more donor antennas, one or more server antennas and a repeater into a pole. The one or more donor antennas can advantageously be located toward the top of the pole, and the one or more server antennas can be located toward the bottom of the pole. The one or more donor antennas can be advantageously located at the top of the pole to increase reception of uplink and downlink wireless communication signals between the repeater and one or more base stations. The one or more donor antennas located toward the top of the pole and the one or more server antennas located toward the bottom of the pole can also advantageously reduce oscillations in the repeater cause by signals transmitted by the one or more donor antennas being received at the one or more server antennas and feeding back to the repeater, and vice versa. Installation and setup can advantageously be simplified with the one or more donor antennas, the one or more server antennas and the repeater integrated with the pole. The pole with the one or more donor antennas, the one or more server antennas and the repeater integrated therein can also advantageously enable the repeater system to be portable.

EXAMPLES

The following examples pertain to specific technology embodiments and point out specific features, elements, or actions that can be used or otherwise combined in achieving such embodiments.

Example 1 includes a repeater system, comprising: a pole; a server antenna carried by the pole; a donor antenna carried by the pole; and a repeater carried by the pole and electrically coupled to the server antenna and the donor antenna.

Example 2 includes the repeater system of Example 1, wherein a radiation pattern of the server antenna is configured to reduce radiation directed to the donor antenna to minimize feedback from the donor antenna, through the repeater, to the server antenna.

Example 3 includes the repeater system of Example 1, wherein a radiation pattern of the donor antenna is configured to reduce radiation directed to the server antenna to minimize feedback from the server antenna, through the repeater, to the donor antenna.

Example 4 includes the repeater system of Example 1, wherein the server antenna is fixably mounted to a first side of the pole and the donor antenna is fixably mounted to a second side of the pole that is opposite to the first side of the pole.

Example 5 includes the repeater system of Example 1, wherein the donor antenna and the repeater are fixably mounted to a first side of the pole and the server antenna is fixably mounted to a second side of the pole that is opposite to the first side of the pole.

Example 6 includes the repeater system of Example 1, wherein the server antenna and the repeater are fixably mounted to a first side of the pole, and the donor antenna is fixably mounted to a second side of the pole that is opposite to the first side of the pole.

Example 7 includes the repeater system of Example 1, wherein the donor antenna is comprised of a first downlink donor antenna and a second uplink donor antenna that are each carried by the pole.

Example 8 includes the repeater system of Example 1, further comprising a radiation shield carried by the pole and located between the server antenna and the donor antenna.

Example 9 includes the repeater system of Example 1, wherein the server antenna, the donor antenna, and the repeater are encompassed by the pole.

Example 10 includes the repeater system of Example 1, wherein the server antenna is detachably mounted to the pole to enable the server antenna to be detached from the pole and mounted adjacent to the pole.

Example 11 includes the repeater system of Example 1, wherein the pole is rotatably mounted to a marine vessel.

Example 12 includes the repeater system of Example 1, wherein the pole is rotatably mounted to an emergency response vehicle.

Example 13 includes the repeater system of Examples 11 and 12, wherein the rotatably mounted pole is configured to be rotated to a vertical direction with the donor antenna located near a top of the pole.

Example 14 includes the repeater system of Example 1, wherein the pole is mounted on a stand.

Example 15 includes the repeater system of Example 1, wherein the pole is mounted on a portable stand.

Example 16 includes the repeater system of Example 1, wherein the donor or server antenna is a directional antenna.

Example 17 includes the repeater system of Example 1, wherein the donor or server antenna is an electrically steered directional antenna.

Example 18 includes the repeater system of Example 1, wherein the donor or server antenna is a mechanically steered directional antenna.

Example 19 includes the repeater system of Example 1, wherein the donor antenna and the server antenna are omnidirectional antennas.

Example 20 includes the repeater system of Example 1, wherein the pole includes a plurality of sections configured to be removably couplable together.

Example 21 includes the repeater of Example 20, wherein the pole includes, the donor antenna carrier by a first section of the pole; the server antenna carried by a second section of the pole;

Example 22 includes the repeater of Example 21, wherein the pole includes, the repeater carried by the second section of the pole.

Example 23 includes the repeater of Example 22, wherein the pole includes, a third section of the pole disposed between the first and second section of the pole.

Example 24 includes the repeater of Example 21, wherein the pole includes, the repeater carried by a third section of the pole.

Example 25 includes the repeater of Example 24, wherein the pole includes, a fourth section of the pole disposed between the first and third section of the pole.

Example 26 includes a repeater system, comprising: a pole; a donor antenna carried by the pole; a server antenna located about the pole; and a repeater carried by the pole and electrically coupled to the server antenna and the donor antenna.

Example 27 includes the repeater system of Example 26, wherein the repeater is fixably mounted to a first side of the pole and the donor antenna is fixably mounted to a second side of the pole that is opposite to the first side of the pole.

Example 28 includes the repeater system of Example 26, wherein the repeater and the donor antenna are fixably mounted to a first side of the pole.

Example 29 includes the repeater system of Example 26, wherein the donor antenna is comprised of a first downlink donor antenna and a second uplink donor antenna.

Example 30 includes the repeater system of Example 26, wherein the donor antenna and the repeater are encompassed by the pole.

Example 31 includes the repeater system of Example 26, wherein the server antenna is mounted adjacent to the pole.

Example 32 includes the repeater system of Example 26, wherein the pole is rotatably mounted to a marine vessel.

Example 33 includes the repeater system of Example 26, wherein the pole is rotatably mounted to a first responder vehicle.

Example 34 includes the repeater system of Example 26, wherein the pole is a rotatably mounted pole that is configured to be rotated to a vertical direction with the donor antenna located near a top of the pole.

Example 35 includes the repeater system of Example 26, wherein the pole is mounted on a stand.

Example 36 includes the repeater system of Example 26, wherein the donor antenna is a directional antenna.

Example 37 includes the repeater system of Example 26, wherein the donor antenna and the server antenna are omnidirectional antennas.

Example 38 includes a repeater system, comprising: a pole; a donor antenna carried by the pole; a repeater carried by the pole and electrically coupled to a server antenna and the donor antenna; and a cradle carried about the pole, wherein the cradle has a first interface capable of selectively carrying a first user equipment and the server antenna that is configured to wirelessly couple one or more radio frequency (RF) communication signals to the first user equipment carried by the first interface of the cradle.

Example 39 includes the repeater system of Example 38, wherein the cradle is coupled to the pole.

Example 40 includes the repeater system of Example 38, wherein the cradle is located adjacent to the pole.

Example 41 includes the repeater system of Example 40, wherein the cradle is coupled to the repeater via a coaxial cable with a length of between 0.5 feet and 40 feet.

Example 42 includes the repeater system of Example 38, wherein a maximum gain of the repeater is one of 23 decibels (dB), 50 dB, 65 dB, or 72 dB at the server antenna.

Example 43 includes the repeater system of Example 38, wherein the maximum gain of the repeater automatically adjusts based on whether the UE is placed in the cradle or not.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

Various techniques, or certain aspects or portions thereof, may take the form of program code (i.e., instructions) embodied in tangible media, such as floppy diskettes, compact disc-read-only memory (CD-ROMs), hard drives, transitory or non-transitory computer readable storage medium, or any other machine-readable storage medium wherein, when the program code is loaded into and executed by a machine, such as a computer, the machine becomes an apparatus for practicing the various techniques. Circuitry may include hardware, firmware, program code, executable code, computer instructions, and/or software. A non-transitory computer readable storage medium may be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term processor may include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module cannot be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as de facto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology may be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation may be made without the exercise of inventive faculty, and without departing from the principles and concepts of the technology. Accordingly, it is not intended that the technology be limited, except as by the claims set forth below.

What is claimed is:

1. A repeater system, comprising:
    a pole including a plurality of sections that includes a first section and a second section;
    a server antenna carried by the first section of the pole;
    a donor antenna carried by the second section of the pole; and
    a repeater carried by the pole and electrically coupled to the server antenna and the donor antenna.

2. The repeater system of claim 1, wherein a radiation pattern of the server antenna is configured to reduce radiation directed to the donor antenna to minimize feedback from the donor antenna, through the repeater, to the server antenna.

3. The repeater system of claim 1, wherein a radiation pattern of the donor antenna is configured to reduce radiation directed to the server antenna to minimize feedback from the server antenna, through the repeater, to the donor antenna.

4. The repeater system of claim 1, wherein the server antenna is fixably mounted to a first side of the pole and the donor antenna is fixably mounted to a second side of the pole that is opposite to the first side of the pole.

5. The repeater system of claim 1, wherein the donor antenna and the repeater are fixably mounted to a first side of the pole and the server antenna is fixably mounted to a second side of the pole that is opposite to the first side of the pole.

6. The repeater system of claim 1, wherein the server antenna and the repeater are fixably mounted to a first side of the pole, and the donor antenna is fixably mounted to a second side of the pole that is opposite to the first side of the pole.

7. The repeater system of claim 1, wherein the donor antenna is comprised of a first downlink donor antenna and a second uplink donor antenna that are each carried by the pole.

8. The repeater system of claim 1, further comprising a radiation shield carried by the pole and located between the server antenna and the donor antenna.

9. The repeater system of claim 1, wherein the server antenna, the donor antenna, and the repeater are encompassed by the pole.

10. The repeater system of claim 1, wherein the server antenna is detachably mounted to the pole to enable the server antenna to be detached from the pole and mounted adjacent to the pole.

11. The repeater system of claim 1, wherein the pole is rotatably mounted to a marine vessel.

12. The repeater system of claim 1, wherein the pole is rotatably mounted to an emergency response vehicle.

13. The repeater system of claim 1, wherein the pole is a rotatably mounted pole that is configured to be rotated to a vertical direction with the donor antenna located near a top of the pole.

14. The repeater system of claim 1, wherein the pole is mounted on a stand.

15. The repeater system of claim 1, wherein the pole is mounted on a portable stand.

16. The repeater system of claim 1, wherein the donor or server antenna is a directional antenna.

17. The repeater system of claim 1, wherein the donor or server antenna is an electrically steered directional antenna.

18. The repeater system of claim 1, wherein the donor or server antenna is a mechanically steered directional antenna.

19. The repeater system of claim 1, wherein the donor antenna and the server antenna are omnidirectional antennas.

20. The repeater system of claim 1, wherein the plurality of sections are configured to be removably couplable together.

21. The repeater of claim 1, wherein the pole includes, the repeater carried by the second section of the pole.

22. The repeater of claim 1, wherein the pole includes, a third section of the pole disposed between the first and second section of the pole.

23. The repeater of claim 1, wherein the pole includes, the repeater carried by a third section of the pole.

24. The repeater of claim 23, wherein the pole includes, a fourth section of the pole disposed between the first and third section of the pole.

25. A repeater system, comprising:
a pole;
a donor antenna carried by the pole;
a server antenna carried by the pole, wherein the donor antenna and the server antenna are located on a single axis;
a repeater carried by the pole and electrically coupled to the server antenna and the donor antenna.

26. The repeater system of claim 25, wherein the repeater is fixably mounted to a first side of the pole and the donor antenna is fixably mounted to a second side of the pole that is opposite to the first side of the pole.

27. The repeater system of claim 25, wherein the repeater and the donor antenna are fixably mounted to a first side of the pole.

28. The repeater system of claim 25, wherein the donor antenna is comprised of a first downlink donor antenna and a second uplink donor antenna.

29. The repeater system of claim 25, wherein the donor antenna and the repeater are encompassed by the pole.

30. The repeater system of claim 25, wherein the server antenna is mounted adjacent to the pole.

31. The repeater system of claim 25, wherein the pole is rotatably mounted to a marine vessel.

32. The repeater system of claim 25, wherein the pole is rotatably mounted to a first responder vehicle.

33. The repeater system of claim 25, wherein the pole is a rotatably mounted pole that is configured to be rotated to a vertical direction with the donor antenna located near a top of the pole.

34. The repeater system of claim 25, wherein the pole is mounted on a stand.

35. The repeater system of claim 25, wherein the donor antenna is a directional antenna.

36. The repeater system of claim 25, wherein the donor antenna and the server antenna are omnidirectional antennas.

* * * * *